US012693961B1

(12) United States Patent
Naveau et al.

(10) Patent No.: US 12,693,961 B1
(45) Date of Patent: *Jul. 28, 2026

(54) TECHNOLOGIES FOR VERIFYING OPERATIONS OF SOFTWARE COMPONENTS

(71) Applicant: TANGRAM FLEX, INC., Dayton, OH (US)

(72) Inventors: Matt D. Naveau, Dayton, OH (US); John P. Weis, Dayton, OH (US); Brandon M. Henry, Dayton, OH (US); Jonathan D. McGill, Dayton, OH (US); Steven D. White, Dayton, OH (US); Eric W. Zwirner, Dayton, OH (US); Matthew R. Schweinefuss, Dayton, OH (US)

(73) Assignee: Tangram Flex, Inc., Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/259,268

(22) Filed: Jul. 3, 2025

Related U.S. Application Data

(63) Continuation of application No. 18/908,280, filed on Oct. 7, 2024, now Pat. No. 12,360,879.

(51) Int. Cl.
*G06F 9/44* (2018.01)
*G06F 11/3604* (2025.01)
*G06F 11/3698* (2025.01)

(52) U.S. Cl.
CPC ...... *G06F 11/3612* (2013.01); *G06F 11/3698* (2025.01)

(58) Field of Classification Search
CPC .......................... G06F 11/3612; G06F 11/3698
See application file for complete search history.

(56) References Cited

U.S. PATENT DOCUMENTS

| | | | |
|---|---|---|---|
| 2005/0021622 A1* | 1/2005 | Cullen | .................... H04L 67/63 |
| | | | 709/204 |
| 2007/0067471 A1 | 3/2007 | Wolfe et al. | |
| 2008/0126902 A1 | 5/2008 | Hickman et al. | |
| 2017/0242784 A1 | 8/2017 | Heorhiadi et al. | |
| 2018/0309634 A1 | 10/2018 | Makovsky | |
| 2019/0370158 A1 | 12/2019 | Rivoir | |
| 2021/0132974 A1 | 5/2021 | Watt, Jr. et al. | |

* cited by examiner

*Primary Examiner* — Hang Pan
(74) *Attorney, Agent, or Firm* — Taft Stettinius & Hollister LLP

(57) ABSTRACT

Technologies for verifying operations of software components include a device with a processor and a memory coupled with the processor, the memory including instructions that, when executed by the processor cause the processor to obtain design data indicative of a model of interconnected components of a software system. The instructions also cause the processor to obtain test sequence data indicative of rules pertaining to a sequence of messages to be communicated between a target component of the software system and one or more other components of the model defined in the design data. Further, the instructions cause the processor to perform, in a test environment that emulates the model in which the target component is defined, a set of verification operations to determine a response of the target component to one or more messages generated as a function of the test sequence data.

20 Claims, 14 Drawing Sheets

300

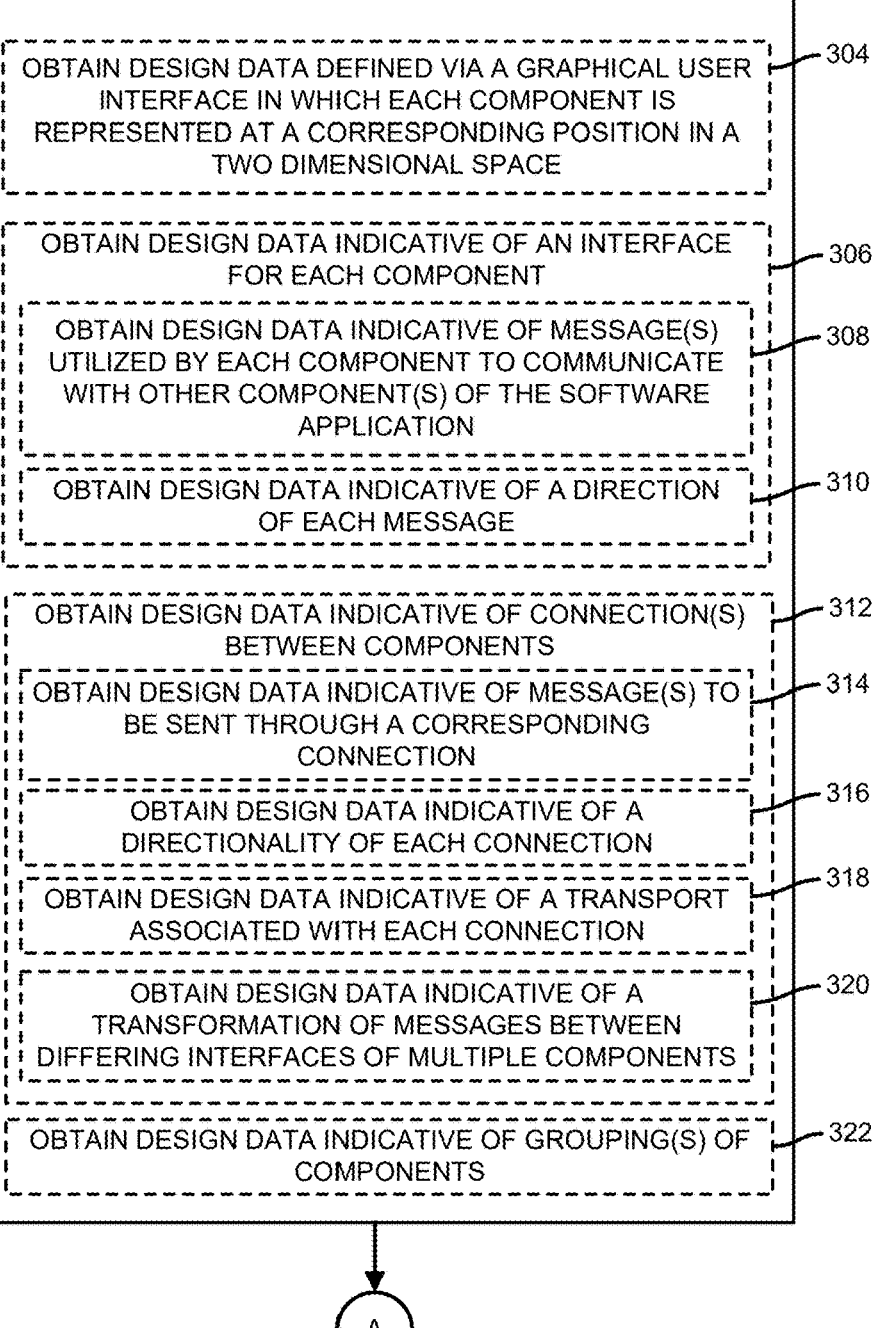

OBTAIN DESIGN DATA INDICATIVE OF A MODEL OF INTERCONNECTED COMPONENTS OF A SOFTWARE SYSTEM —— 302

OBTAIN DESIGN DATA DEFINED VIA A GRAPHICAL USER INTERFACE IN WHICH EACH COMPONENT IS REPRESENTED AT A CORRESPONDING POSITION IN A TWO DIMENSIONAL SPACE —— 304

OBTAIN DESIGN DATA INDICATIVE OF AN INTERFACE FOR EACH COMPONENT —— 306

OBTAIN DESIGN DATA INDICATIVE OF MESSAGE(S) UTILIZED BY EACH COMPONENT TO COMMUNICATE WITH OTHER COMPONENT(S) OF THE SOFTWARE APPLICATION —— 308

OBTAIN DESIGN DATA INDICATIVE OF A DIRECTION OF EACH MESSAGE —— 310

OBTAIN DESIGN DATA INDICATIVE OF CONNECTION(S) BETWEEN COMPONENTS —— 312

OBTAIN DESIGN DATA INDICATIVE OF MESSAGE(S) TO BE SENT THROUGH A CORRESPONDING CONNECTION —— 314

OBTAIN DESIGN DATA INDICATIVE OF A DIRECTIONALITY OF EACH CONNECTION —— 316

OBTAIN DESIGN DATA INDICATIVE OF A TRANSPORT ASSOCIATED WITH EACH CONNECTION —— 318

OBTAIN DESIGN DATA INDICATIVE OF A TRANSFORMATION OF MESSAGES BETWEEN DIFFERING INTERFACES OF MULTIPLE COMPONENTS —— 320

OBTAIN DESIGN DATA INDICATIVE OF GROUPING(S) OF COMPONENTS —— 322

TECHNOLOGIES FOR VERIFYING OPERATIONS OF SOFTWARE COMPONENTS

CROSS-REFERENCE TO RELATED APPLICATION

The instant application is a continuation of U.S. patent application Ser. No. 18/908,280 entitled "TECHNOLO-GIES FOR VERIFYING OPERATIONS OF SOFTWARE COMPONENTS", filed Oct. 7, 2024, the entire disclosure of which is incorporated herein by reference.

BACKGROUND

For complex systems, such as software systems that perform sophisticated analysis of data, provide autonomous or semi-autonomous control of one or more machines, or that coordinate communications between disparate devices, the functionality of such systems is often the culmination of multiple components (e.g., parts, executed as processes, threads, microservices, etc.) operating in conjunction with each other. In many organizations, personnel may be split into teams to concurrently design and implement different components of a software system. In many cases, a component designed and developed by one team may not operate as intended in view of unexpected interactions with other components of the larger system. As changes regarding the functionality of components within the system evolve over time, the problem may be exacerbated. Such problems in the integration of software components into a larger system may lead to delays in development and/or anomalies that may go undetected until the system is operating in a production environment. Indeed, testing the functionality of any given component requires, in conventional systems, development of software to perform the operations of all components with which the component to be tested interacts. Doing so is resource intensive and, in many cases, presents such an intractable problem that development teams avoid such testing altogether.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements. The detailed description particularly refers to the accompanying figures in which:

FIGS. 3-6 are flowcharts of at least one embodiment of a method for verifying operations of a software component that may be performed by the system of FIG. 1.

DETAILED DESCRIPTION OF THE DRAWINGS

Figure 1:
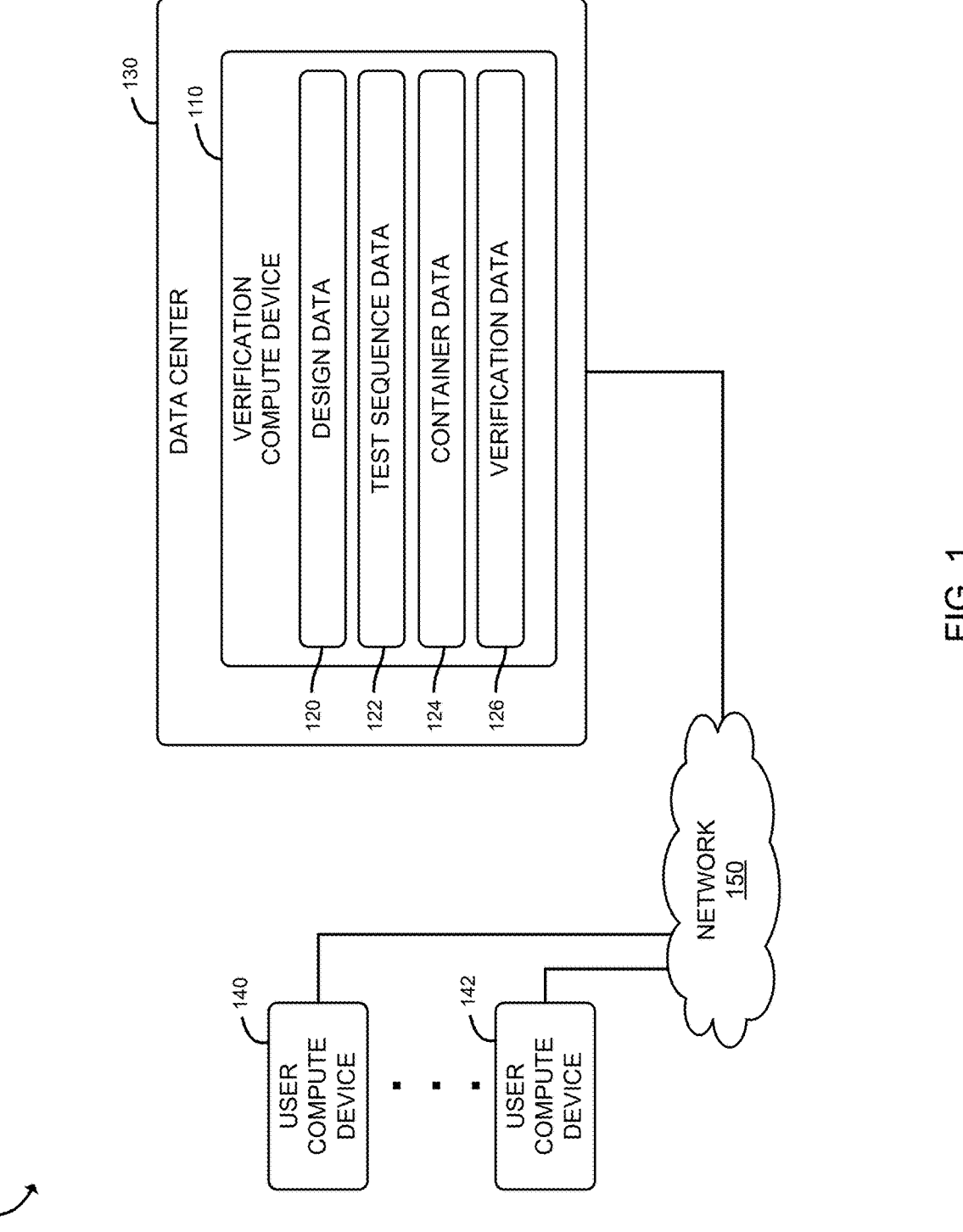
FIG. 1 is a simplified block diagram of at least one embodiment of a system for verifying operations of software components.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for verifying operations of software components (referred herein as "components") includes, in the illustrative embodiment, a verification compute device 110 communicatively connected to user compute devices 140, 142. In at least some embodiments, the verification compute device 110 may be located in a data center 130 (e.g., a cloud data center) which may be embodied as a set of networked computer servers (each a compute device) and associated infrastructure (e.g., energy distribution devices, thermal management devices, networking devices) to execute software (e.g., one or more software applications) and manage data on behalf of one or more parties (e.g., organizations). In operation, the verification compute device 110 may enable users (e.g., of the user compute devices 140, 142) to define a model of a software system having multiple interconnected components and test the behavior (e.g., responses) of a selected component (e.g., a target component) against a sequence of messages generated by the verification compute device 110 based on a defined set of rules (test sequence data). In doing so, the verification compute device 110 may execute the target component in a container (e.g., a set of software that includes the code for the component and all dependencies (e.g., runtime, system tools, system libraries) to enable the component to execute in isolation, without reliance on an external source for those dependencies and without variation from one host operating system to another). In conjunction with execution the target component, the verification compute device 110, in the illustrative embodiment, concurrently executes an emulation of the remainder of the model defined in the design data 120 to determine how the target component interacts with the other components of the model (e.g., via messages).

As indicated in FIG. 1, in operation, the verification compute device 110 may operate on design data 120 which may be embodied as any data indicative of a model of a software system with interconnected components (e.g., processes, threads, microservices, etc.). The verification compute device 110, in the illustrative embodiment, also utilizes test sequence data 122, which may be embodied as any data indicative of one or more rules pertaining to a sequence of messages to be sent to and/or received from a target component (e.g., defined in the model in the design data 120), including properties of the messages (e.g., chronological order of the messages, format of the messages, constraints on parameters in the messages), to verify the operation of the target component. Further, in the illustrative embodiment, the verification compute device 110 utilizes container data 124, which may be embodied as any data indicative of containers (e.g., Docker container images) for one or more components defined in the model. The verification compute device 110, in operation, may produce verification data 126, which may be embodied as any data indicative of results of verification operations performed by the verification compute device 110 (e.g., determinations as to whether responses of the target component comply with rules defined in the test sequence data (e.g., chronological order of the messages, format of the messages, constraints on parameters in the messages), log messages, and/or debug messages). Unlike conventional systems in which the behavior of a software component in a larger software system may be difficult to ascertain until the software component is actually integrated into the larger software system, the system 100 and in particular, the verification compute device 110, enables software development teams to efficiently and reliably determine whether a component in a model of a software system (e.g., processes, threads, microservices associated with one or more software applications) will operate as expected without the need to fully integrate the software component into the system beforehand. Accordingly, the system 100 enables more efficient development of software components and reduces the likelihood anomalous behavior (e.g., errors, malfunctions, etc.) in any of the software components once they are integrated into a system.

While a relatively small number of devices 110, 140, 142 are shown in FIG. 1 for simplicity and clarity, it should be understood that the number of devices, in practice, may range in the tens, hundreds, thousands, or more. Likewise, it should be understood that the devices 110, 140, 142 may be distributed differently or perform different roles than the configuration shown in FIG. 1. Further, though shown as separate devices 110, 140, 142 in some embodiments, the functionality of one or more of the devices 110, 140, 142 may be combined into fewer devices (e.g., the verification compute device 110 and a user compute device 140, 142 may be the same device) and/or distributed across more devices (e.g., the operations of the verification compute device 110 may be distributed over multiple compute devices in the data center 130) than those shown in FIG. 1.

Figure 2:
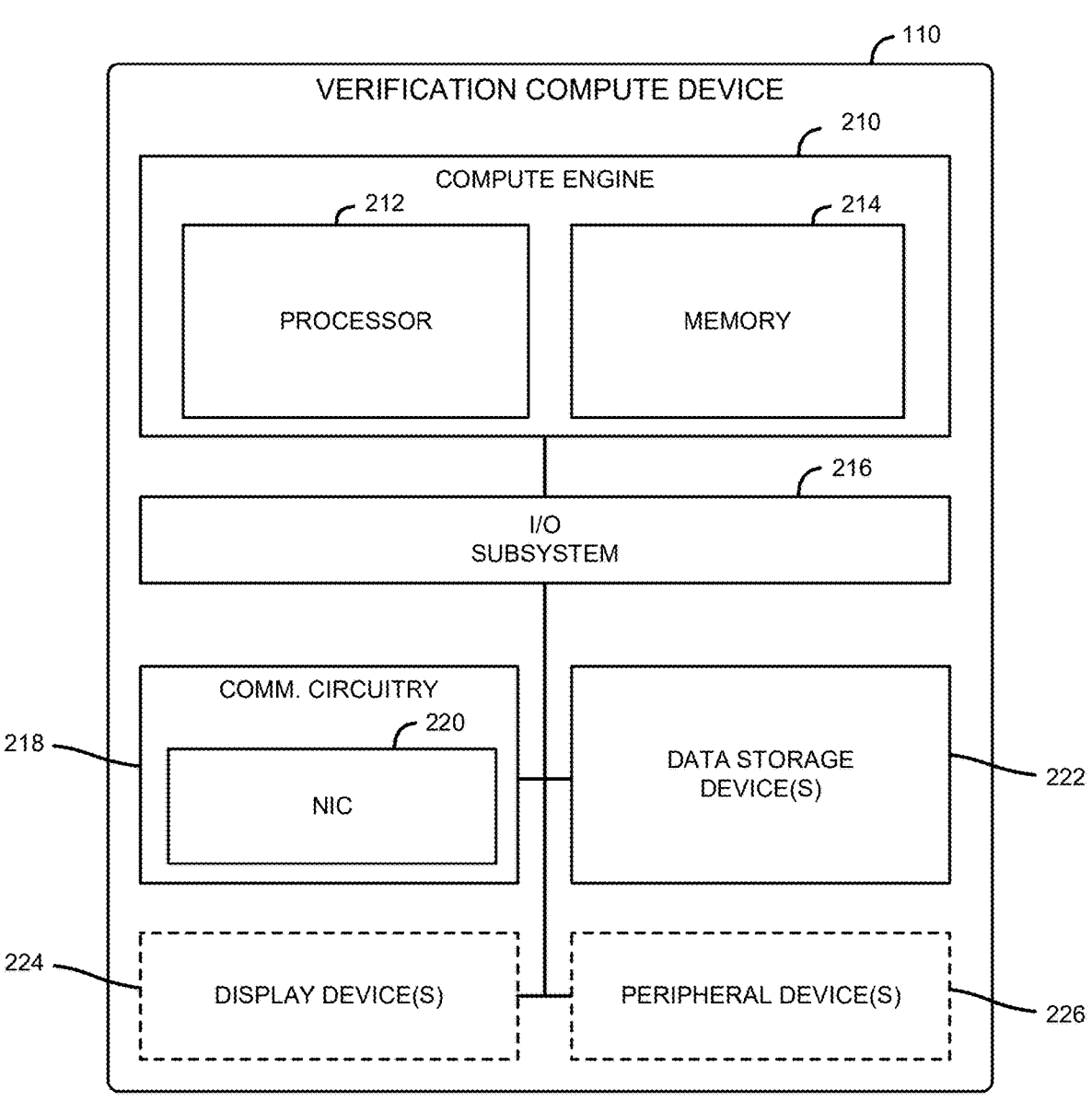
FIG. 2 is a diagram of at least one embodiment of a compute device of the system of FIG. 1.

Referring now to FIG. 2, an illustrative embodiment of the verification compute device 110, includes a compute engine 210, an input/output (I/O) subsystem 216, communication circuitry 218, and one or more data storage devices 222. In some embodiments, the verification compute device 110 may include one or more display devices 224 and/or one or more peripheral devices 226 (e.g., a mouse, a physical keyboard, etc.). In some embodiments, one or more of the illustrative components may be incorporated in, or otherwise form a portion of, another component. The compute engine 210 may be embodied as any type of device or collection of devices capable of performing various compute functions. In some embodiments, the compute engine 210 may be embodied as a single device such as an integrated circuit, an embedded system, a field-programmable gate array (FPGA), a system-on-a-chip (SOC), or other integrated system or device. Additionally, in the illustrative embodiment, the compute engine 210 includes or is embodied as at least one processor 212 and a memory 214. The processor 212 may be embodied as any type of processor capable of performing the functions described herein. For example, the processor 212 may be embodied as a single or multi-core processor(s), a microcontroller, or other processor or processing/controlling circuit. In some embodiments, the processor 212 may be embodied as, include, or be coupled to an FPGA, an application specific integrated circuit (ASIC), one or more graphics processing units (GPUs), neural processing units (NPUs), and/or floating point units (FPUs), reconfigurable hardware or hardware circuitry, or other specialized hardware to facilitate performance of the functions described herein.

In embodiments, the processor 212 is capable of receiving, e.g., from the memory 214 or via the I/O subsystem 216, a set of instructions which when executed by the processor 212 cause the verification compute device 110 to perform one or more operations described herein. In embodiments, the processor 212 is further capable of receiving, e.g., from the memory 214 or via the I/O subsystem 216, one or more signals from external sources, e.g., from the peripheral devices 226 or via the communication circuitry 218 from an external compute device, external source, or external network. As one will appreciate, a signal may contain encoded instructions and/or information. In embodiments, once received, such a signal may first be stored, e.g., in the memory 214 or in the data storage device(s) 222, thereby allowing for a time delay in the receipt by the processor 212 before the processor 212 operates on a received signal. Likewise, the processor 212 may generate one or more output signals, which may be transmitted to an external device, e.g., an external memory or an external compute engine via the communication circuitry 218 or, e.g., to one or more display devices 224. In some embodiments, a signal may be subjected to a time shift in order to delay the signal. For example, a signal may be stored on one or more storage devices 222 to allow for a time shift prior to transmitting the signal to an external device. One will appreciate that the form of a particular signal will be determined by the particular encoding a signal is subject to at any point in its transmission (e.g., a signal stored will have a different encoding than a signal in transit, or, e.g., an analog signal will differ in form from a digital version of the signal prior to an analog-to-digital (A/D) conversion).

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. In some embodiments, all or a portion of the main memory 214 may be integrated into the processor 212. In operation, the main memory 214 may store various software and data used during operation such as design data, test sequence data, container data, verification data, applications, libraries, and drivers.

The compute engine 210 is communicatively coupled to other components of the verification compute device 110 via the I/O subsystem 216, which may be embodied as circuitry and/or components to facilitate input/output operations with the compute engine 210 (e.g., with the processor 212 and the main memory 214) and other components of the verification compute device 110. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the verification compute device 110, into the compute engine 210.

The communication circuitry 218 may be embodied as any communication circuit, device, or collection thereof, capable of enabling communications over a network between the verification compute device 110 and another device (e.g., a device 140, 142, etc.). The communication circuitry 218 may be configured to use any one or more communication technology (e.g., wired or wireless communications) and associated protocols (e.g., Ethernet, Wi-Fi®, WiMAX, Bluetooth®, etc.) to effect such communication.

The illustrative communication circuitry 218 includes a network interface controller (NIC) 220. The NIC 220 may be embodied as one or more add-in-boards, daughter cards, network interface cards, controller chips, chipsets, or other devices that may be used by the verification compute device 110 to connect with another device (e.g., a compute device 140, 142, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. Additionally or alternatively, in such embodiments, the local memory of the NIC 220 may be integrated into one or more components of the verification compute device 110 at the board level, socket level, chip level, and/or other levels.

Each data storage device 222, may be embodied as any type of device configured for short-term or long-term storage of data such as, for example, memory devices and circuits, memory cards, hard disk drives, solid-state drives, or other data storage device. Each data storage device 222 may include a system partition that stores data and firmware code for the data storage device 222 and one or more operating system partitions that store data files and executables for operating systems.

Each display device 224 may be embodied as any device or circuitry (e.g., a liquid crystal display (LCD), a light emitting diode (LED) display, a cathode ray tube (CRT) display, etc.) configured to display visual information (e.g., text, graphics, etc.) to a user. In some embodiments, a display device 224 may be embodied as a touch screen (e.g., a screen incorporating resistive touchscreen sensors, capacitive touchscreen sensors, surface acoustic wave (SAW) touchscreen sensors, infrared touchscreen sensors, optical imaging touchscreen sensors, acoustic touchscreen sensors, and/or other type of touchscreen sensors) to detect selections of on-screen user interface elements or gestures from a user.

In the illustrative embodiment, the components of the verification compute device 110 are housed in a single unit. However, in other embodiments, the components may be in separate housings. The other devices 140, 142 may include components similar to those of the verification compute device 110. Further, the devices 110, 140, 142 may include other components, sub-components, and devices commonly found in a computing device, which are not discussed above in reference to the verification compute device 110 and not discussed herein for clarity of the description.

In the illustrative embodiment, the devices 110, 140, 142 are in communication via a network 150, which may be embodied as any type of wired or wireless communication network, including global networks (e.g., the internet), wide area networks (WANs), local area networks (LANs), digital subscriber line (DSL) networks, cable networks (e.g., coaxial networks, fiber networks, etc.), cellular networks (e.g., Global System for Mobile Communications (GSM), Long Term Evolution (LTE), Worldwide Interoperability for Microwave Access (WiMAX), 3G, 4G, 5G, etc.), a radio area network (RAN), or any combination thereof.

Figure 7:
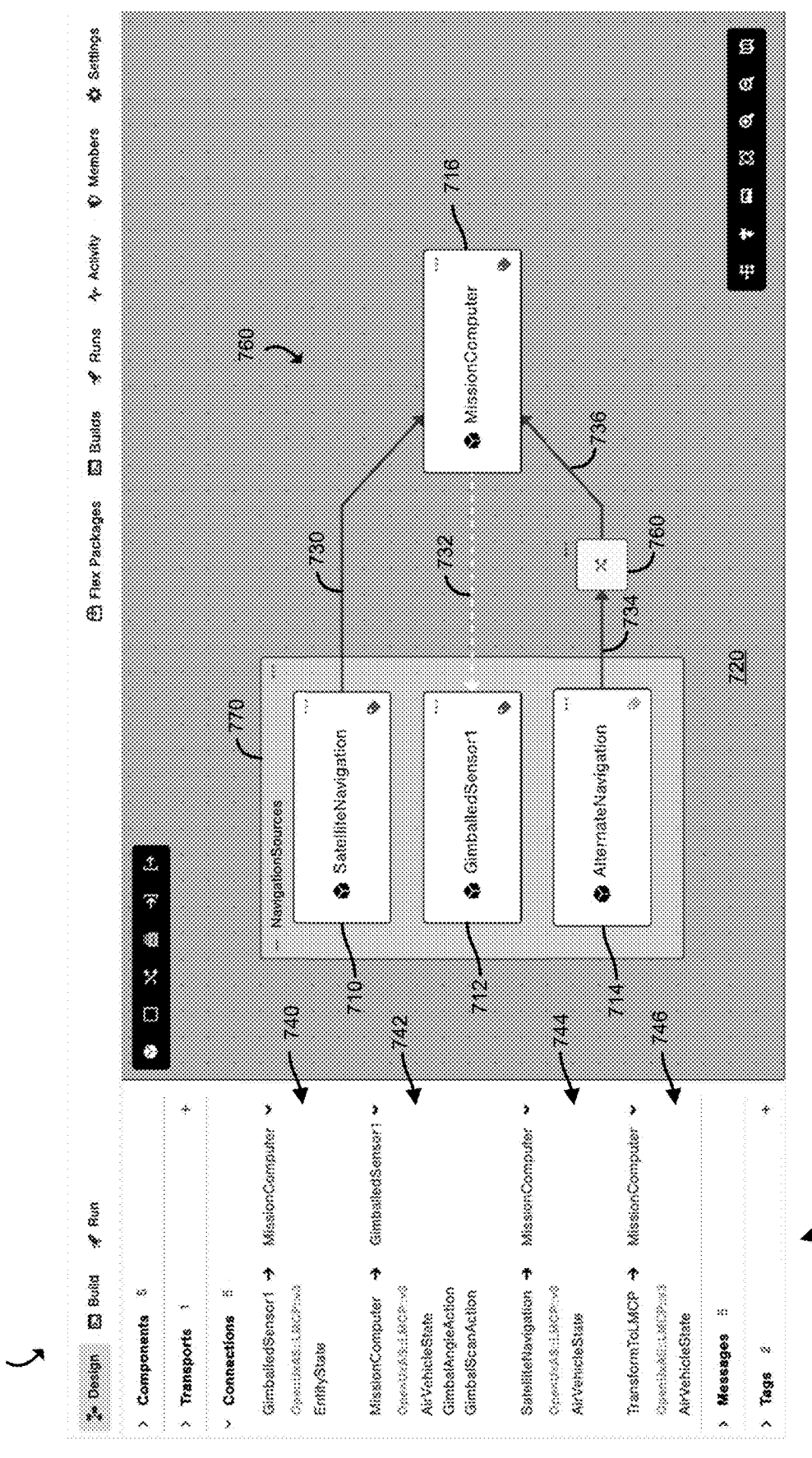
FIGS. 7-14 are diagrams of user interfaces that may be produced by the system of FIG. 1 in association with the method of FIGS. 3-6.

Referring now to FIG. 3, the system 100 (e.g., the verification compute device 110) may perform a method 300 for verifying the operations of a software component. The method 300, in the illustrative embodiment, begins with block 302 in which the verification compute device 110 obtains design data (e.g., the design data 120), which may be embodied as any data indicative of a model of interconnected components of a software system. In doing so, the verification compute device 110 may obtain design data defined via a graphical user interface in which each component is represented at a corresponding position in a two dimensional space (e.g., a stage), as indicated in block 304. Referring briefly to FIG. 7, a user interface 700 that may be produced by the verification compute device 110 (e.g., and remotely accessed by a user compute device 140, 142 via the network 150) includes a two dimensional space 720 in which components (e.g., software components) 710, 712, 714, 716 have been interconnected in a model 760 of a software system (e.g., by a user of a compute device 140, 142).

Figure 8:
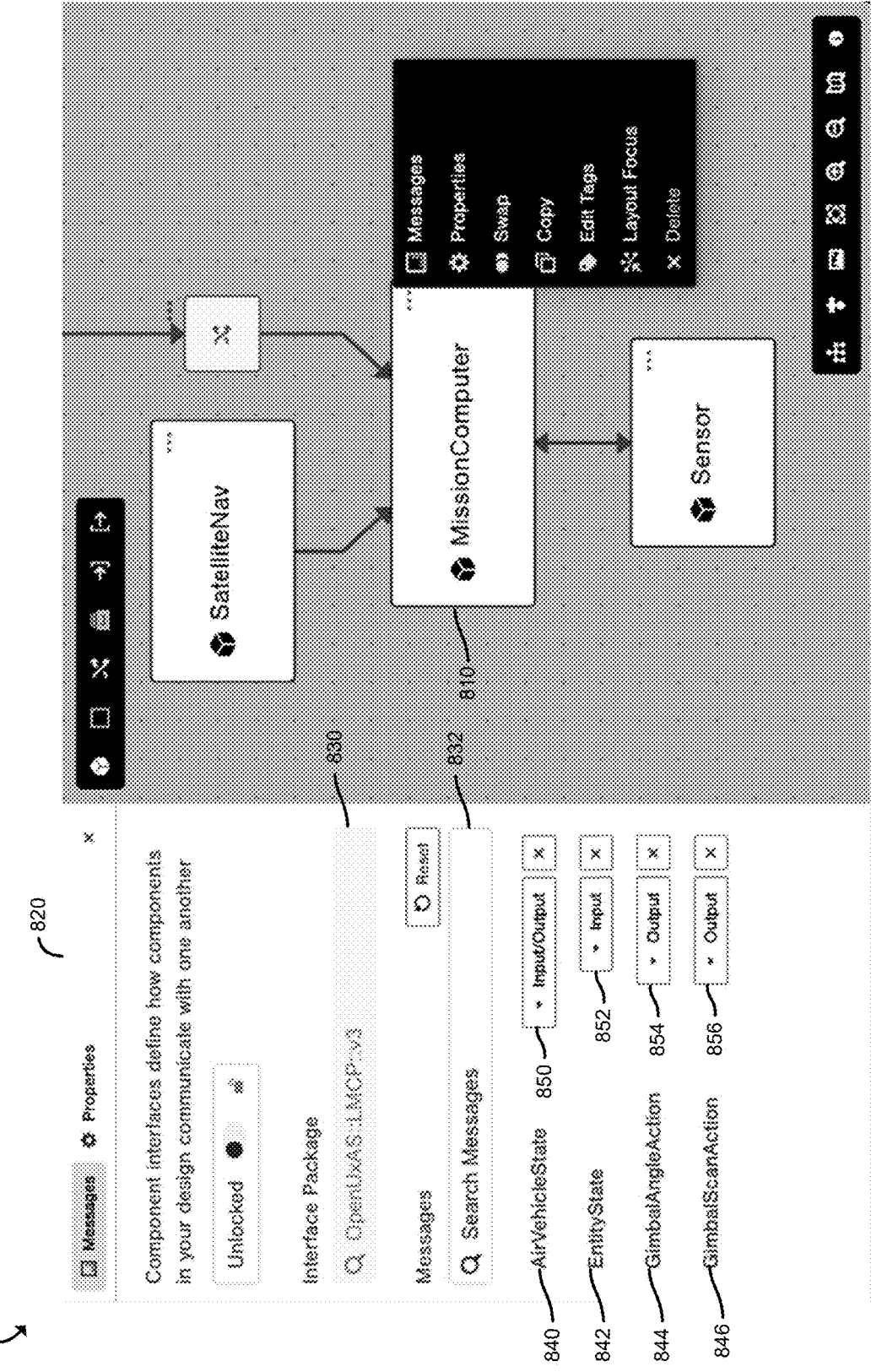

Continuing the method 300, the verification compute device 110, in the illustrative embodiment, obtains design data that is indicative of an interface for each component, as represented in block 306. In doing so, and as indicated in block 308, the verification compute device 110 may obtain design data that is indicative of one or more messages utilized (e.g., received or sent) by each component to communicate with one or more other components of the software system (e.g., represented in the model 760). Further, and as indicated in block 310, the verification compute device 110 may obtain design data that is indicative of a direction (e.g., input or output, from the perspective of a given component) of each message (e.g., from block 308). Referring briefly to FIG. 8, a user interface 800 that may be produced by the verification compute device 110 enables a user to define the interface for a selected component 810. In a panel 820 pertaining to messages to be utilized by the selected component 810, the verification compute device 110 may present one or more defined interface packages 830 that includes predefined messages (e.g., types of messages). For a given interface package, the verification compute device 110 may enable a user to enter search terms (e.g., in a search field) 832 to identify and select messages 840, 842, 844, 846 (e.g., types of messages) to be utilized by the selected component 810. Further, through corresponding drop down menus 850, 852, 854, 856 for each selected message 840, 842, 844, 846, the verification compute device 110 enables a user to select the direction of the message (e.g., input and/or output, input only, or output only).

Further, in obtaining design data, the verification compute device 110, in the illustrative embodiment, obtains data indicative of connections between components in the model, as indicated in block 312. In doing so, and as indicated in block 314, the verification compute device 110 may obtain design data indicative of messages to be sent through a corresponding connection. Further, the verification compute device 110 may obtain design data that is indicative of a directionality of each connection (e.g., in, out, or bidirectional, source and destination, etc.), as indicated in block 316. Additionally, the verification compute device 110 may obtain design data that is indicative of a transport (e.g., a message delivery system, such as Apache ActiveMQ, Apache Kafka, NATS, RabbitMQ, ZeroMQ, user datagram protocol (UDP), transport control protocol (TCP), etc.) associated with each connection (e.g., to deliver the messages), as indicated in block 318. In at least some embodiments, the verification compute device 110 may obtain design data indicative of a transformation of messages between differing interfaces of components, as indicated in block 320. Referring back to FIG. 7, connections 730, 732, 734, 736 connect the components 710, 712, 714, 716. Further, properties of the connections may be defined in corresponding sections 740, 742, 744, 746 of the panel 750. Additionally, a transform 760 (e.g., a representation of a message transformation function) is positioned between the components 714, 716 to indicate that messages sent from the component 714 to the component 716 are to be transformed from one format and/or transport (e.g., associated with an interface of the component 714) to another format and/or transport (e.g., associated with an interface of the component 716) to enable communication between the different interfaces of the components 714, 716. In some embodiments, the verification compute device 110 may obtain design data indicative of a grouping of components (e.g., to enable the components in the group to be easily identified as pertaining to a given type of functionality or subsystem in the model), as indicated in block 322. In FIG. 7, the components 710, 712, 714 are within a group 770 pertaining to navigation sources.

In some embodiments, the design data may be produced through execution (e.g., by the verification compute device 110 or by another compute device 140, 142) of a machine learning model, such as a generative artificial intelligence model (e.g., a large language model). The machine learning model may receive input data indicative of messages that have been transmitted between the components, descriptions, and/or diagrams of the components. Further, the machine learning model may be trained to determine the interfaces and connections between the components from the input data and produce the design data (e.g., by controlling interactions with the graphical user interface of block 304 or by directly encoding the design data (e.g., in a language utilized by the verification compute device 110 to represent the design data)).

Figure 4:
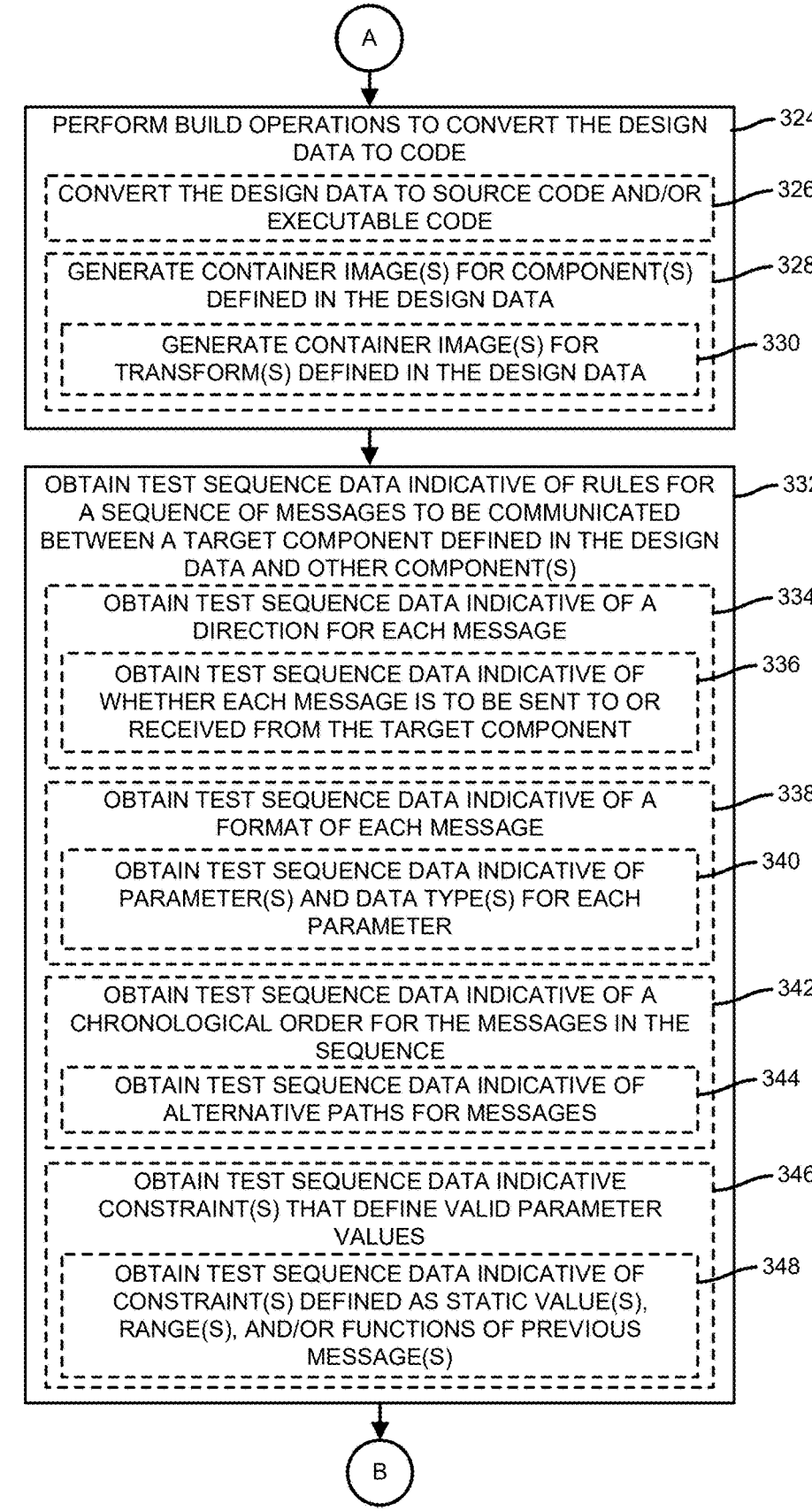

Referring now to FIG. 4, in the illustrative embodiment, the method 300 continues in block 324, in which the verification compute device 110 performs build operations to convert the design data (e.g., from block 302) to code. In doing so, the verification compute device 110 may convert the design data to source code (e.g., C++, Rust, MISRA-C). The generated code, in the illustrative embodiment includes message definitions, application programming interface (API) libraries and built-in tests. The verification compute device 110 may also convert the design data to executable code (e.g., by compiling the source code discussed above to object code/machine code). The above operations are represented in block 326. In at least some embodiments, the verification compute device 110 may generate one or more container images (e.g., Docker container images) for components defined in the design data, as indicated in block 328. A container image may be embodied as a standalone executable file that contains all of the libraries, dependencies, and files that a container needs to operate. The verification compute device 110 may also generate container images for any transforms defined in the design data (e.g., the transform 760 in FIG. 7), as indicated in block 330.

Continuing the method 300, in block 332, the verification compute device 110, in the illustrative embodiment, may obtain test sequence data (also referred to as a message sequence model) that may be embodied as any data indicative of a sequence of messages to be communicated between a target component defined in the design data and one or more other components defined in the design data (e.g., in the model of the software system) from block 302. As indicated in block 334, the verification compute device 110 may obtain test sequence data indicative of a direction for each message (e.g., to be communicated to or from the target component). In doing so, the verification compute device 110 may obtain test sequence data indicative of whether each message is to be sent to or received from the target component, as indicated in block 336.

The verification compute device 110 may obtain test sequence data that is indicative of a format for each message to be sent to or received from the target component, as indicated in block 338. In doing so, and as indicated in block 340, the verification compute device 110 may obtain test sequence data that is indicative of one or more parameters (e.g., fields) and a corresponding data type (e.g., integer, floating point, string, etc.) for each parameter in a message. Additionally, the verification compute device 110 may obtain test sequence data that is indicative of a chronological order for the messages in the sequence, as indicated in block 342. Relatedly, the verification compute device 110 may obtain test sequence data that is indicative of alternative paths for messages, as indicated in block 344. That is, a sequence of messages may begin with a particular chronological order of messages to be sent to and/or received from the target component, but may split off into multiple possible chronological orders of messages (e.g., based on a determination made by the target component or a component with which the target component communicates). As such, a set of messages may be valid in particular conditions (e.g., pursuant to one path) while another set of messages may be valid under a different set of conditions (e.g., pursuant to an alternative path). In some embodiments, the verification compute device 110 may obtain test sequence data that is indicative of one or more constraints that define valid parameter values (e.g., values for parameters in the message(s) to be sent to or received from the target component), as indicated in block 346. The verification compute device 110, in doing so, may obtain test sequence data that is indicative of a constraint defined as a static value, a range of values, and/or a function (e.g., a function of data from one or more previous messages in the chronological order), as indicated in block 348.

Figure 9:
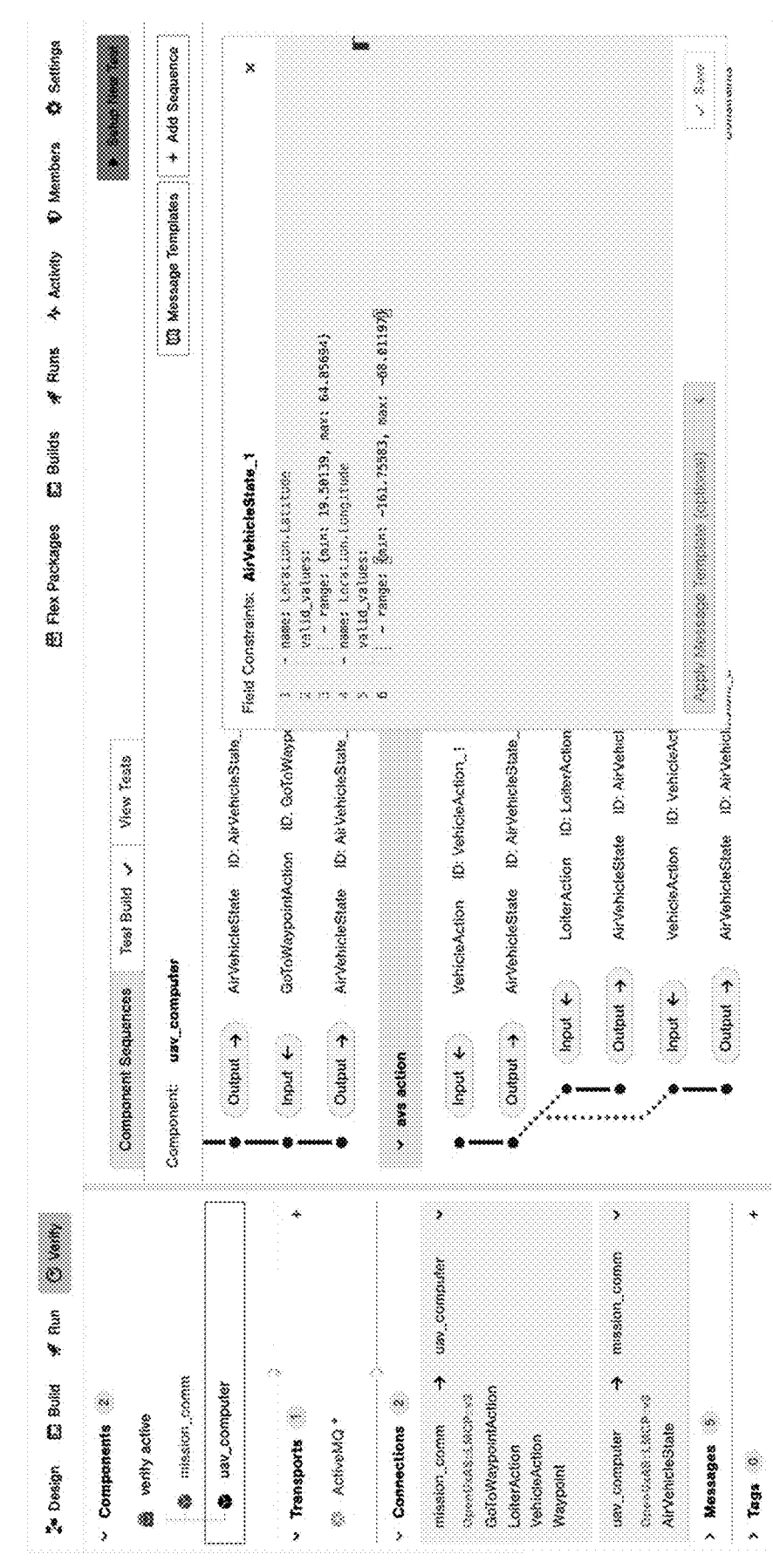
Figure 10:
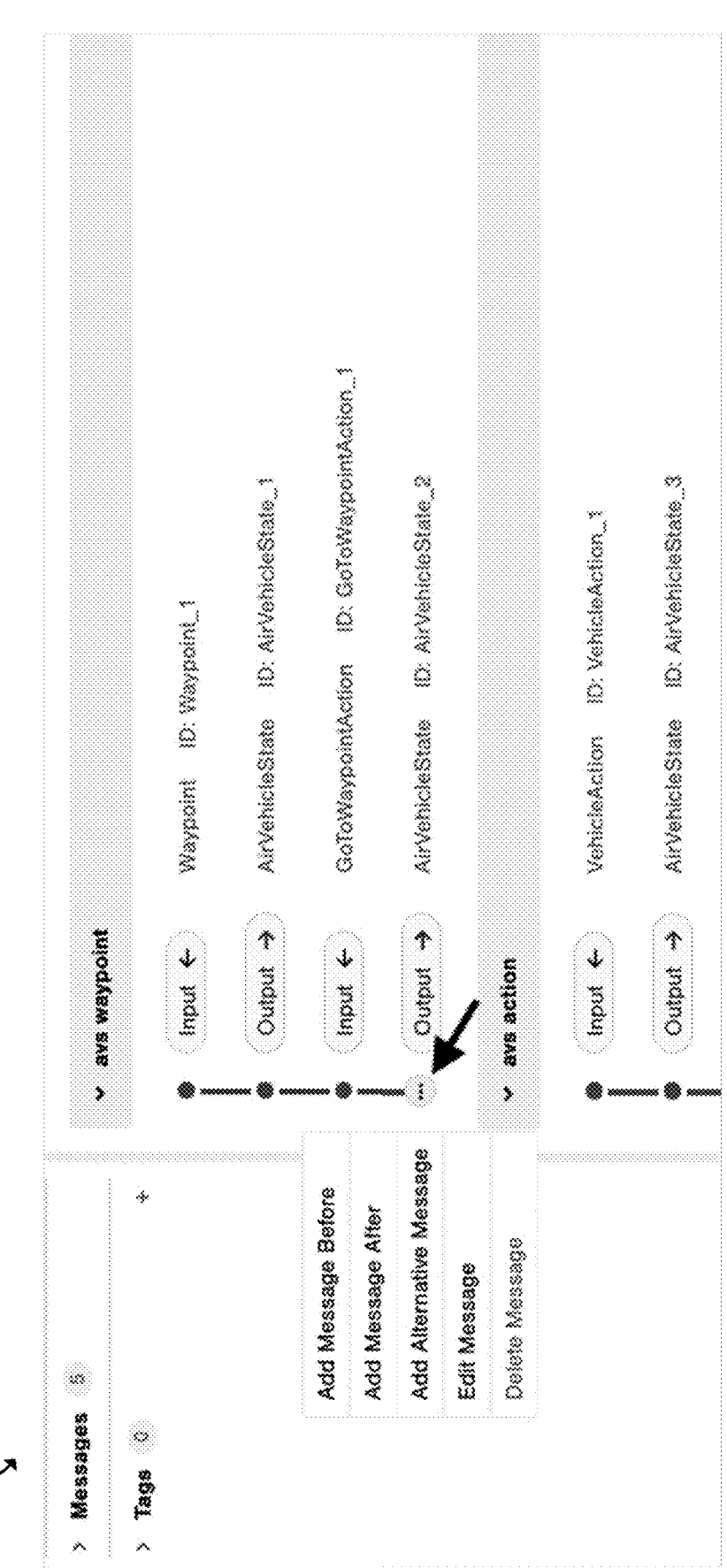
Figure 11:
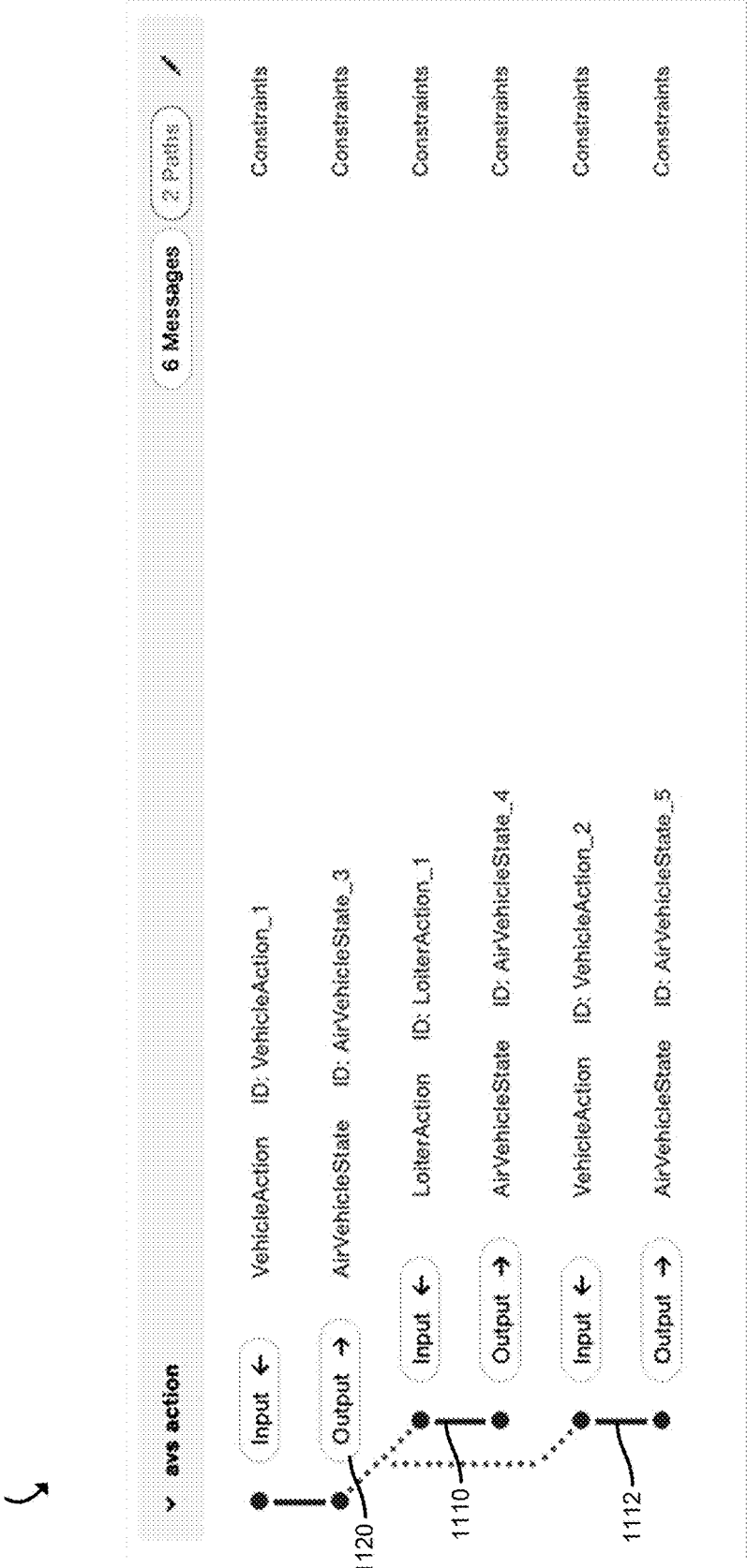
Figure 12:
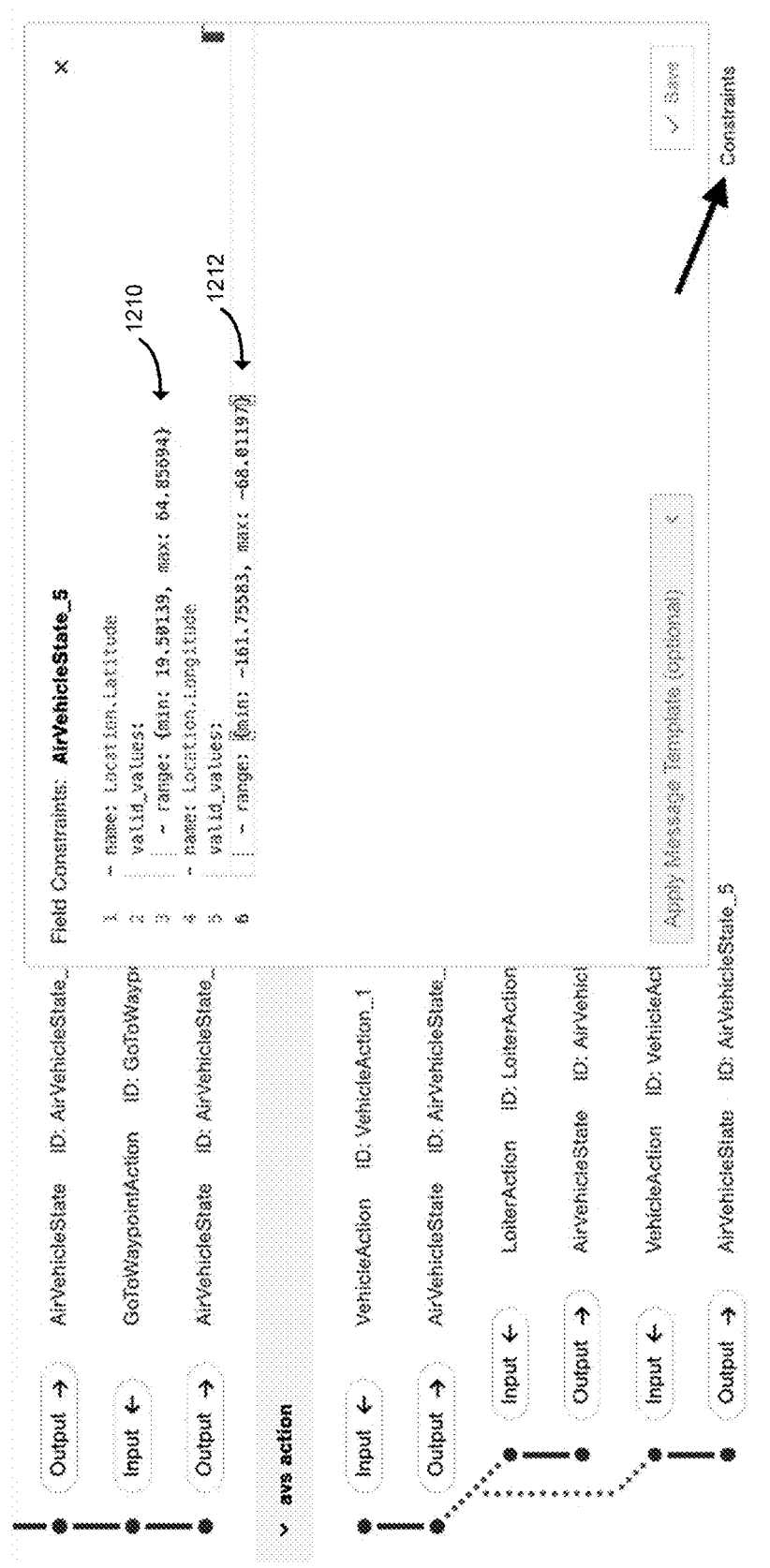

Referring now to FIG. 9, the verification compute device 110 may provide a user interface 900 (e.g., accessed remotely by a user compute device 140, 142) to enable a user (e.g., of a user compute device 140, 142) to define test sequence data. Referring to the user interface 1000 in FIG. 10, messages may be added iteratively to build a chronological order (e.g., with the progression of time represented in the downward direction in the user interface 1000). For each message, the properties of the message are defined (e.g., the direction of the message, etc.). Further, the user interface 1000 enables a user to establish an alternative path (e.g., by adding an alternative message in a sequence). Referring briefly to FIG. 11, a user interface 1100 illustrates two paths 1110, 1112 that messages could follow (e.g., depending on a condition, such as data in an output message 1120). FIG. 12 illustrates an embodiment of a user interface 1200 that may be produced by the verification compute device 110 (e.g., and accessed by a user compute device 140, 142) in which constraints 1210, 1212 (e.g., ranges for two parameters, Location.Latitude and Location.Longitude) are defined.

Figure 5:
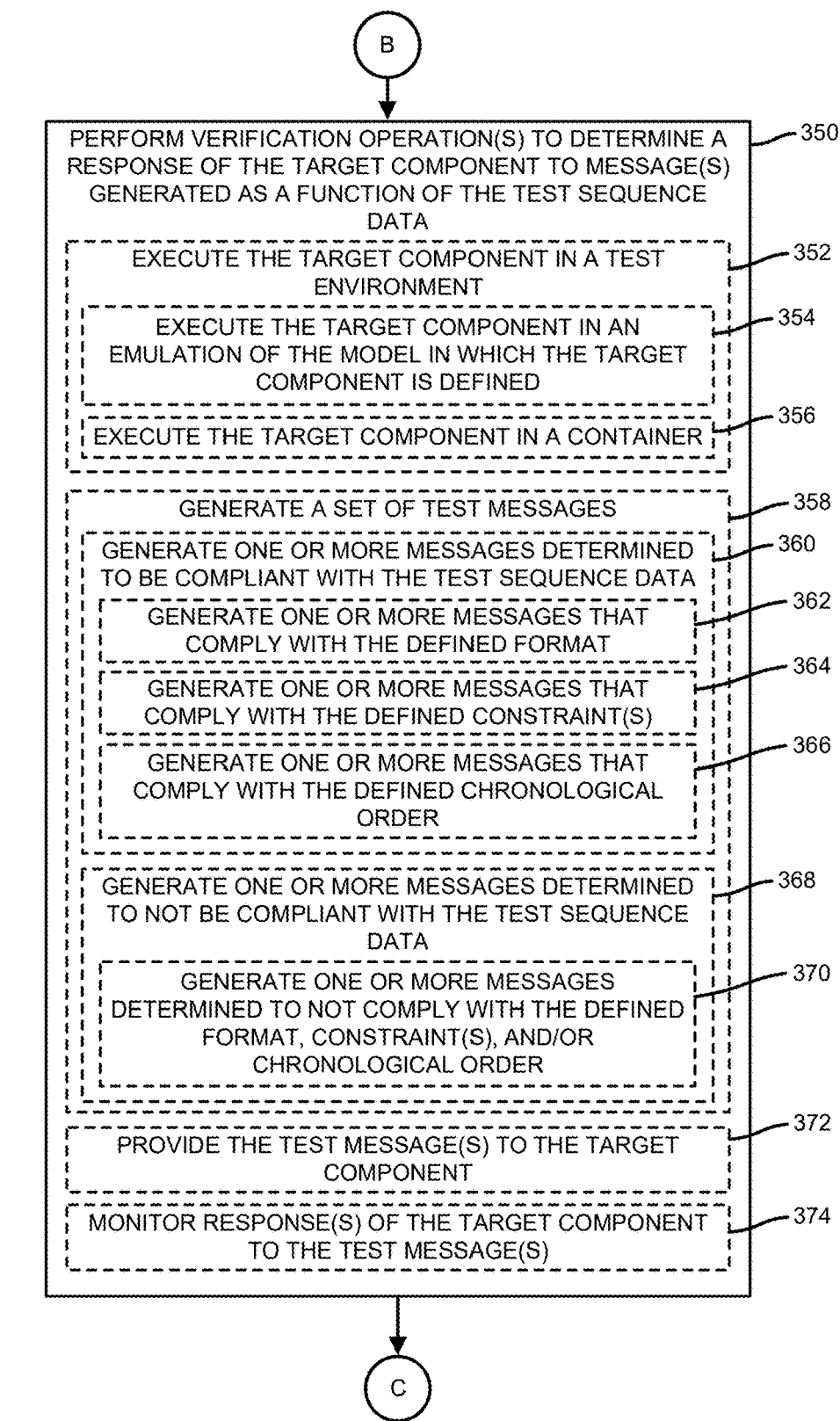

Referring now to FIG. 5, in block 350, the verification compute device 110, in the illustrative embodiment, performs one or more verification operations to determine a response of the target component to one or more messages generated (e.g., by the verification compute device 110) as a function of (e.g., based on) the test sequence data (e.g., from block 332). That is, the verification compute device 110, in the illustrative embodiment, may generate random messages with random parameter values based on (e.g., within the limits of) the test sequence data, rather than requiring a software developer to manually produce a set of test messages and without generating random messages that have no basis in the interfaces of the components and the connections between them (e.g., as represented by the design data). In doing so, and as indicated in block 352, the verification compute device 110 executes the target component in a test environment. As indicated in block 354, the verification compute device 110, in the illustrative embodiment, executes the target component in an emulation of the model in which the target component is defined (e.g., in which the verification compute device 110 interacts with the target component pursuant to connections defined between the target component and other components in the model defined in the design data from block 302). As indicated in block 356, the verification compute device 110 may execute the target component in a container (e.g., a Docker container, based on a container image generated in block 328 of FIG. 4). In some embodiments, the verification compute device 110 may perform the verification operations in connection with (e.g., as a selectable option in) a graphical user interface through which the design data and test sequence data was provided, while in other embodiments, the verification operations may be executed separately from that user interface.

As indicated in block 358, in performing verification operations, the verification compute device 110 generates a set of test messages. In doing so, the verification compute device 110 may generate one or more messages determined to be compliant with the test sequence data (e.g., from block 332), as indicated in block 360. To do so, the verification compute device 110 may generate one or more messages that comply with a defined format, as indicated in block 362, that comply with defined constraints, as indicated in block

364, and/or that comply with a defined chronological order (e.g., including any alternative paths), as indicated in block 366. In some embodiments, the verification compute device 110 may generate one or more messages determined to not be compliant with the test sequence data (e.g., to test the response of the target component to invalid message(s)), as indicated in block 368. In doing so, the verification compute device 110 may generate one or more messages determined to not comply with a format, constraint(s), and/or chronological order (e.g., including any alternative paths) defined in the test sequence data, as indicated in block 370. In block 372, the verification compute device 110, in the illustrative embodiment, provides (e.g., sends) one or more test messages (e.g., generated in block 358) to the target component (e.g., in the emulation of the model of the software system). Further, and as indicated in block 374, the verification compute device 110 monitors response(s) of the target component to the test message(s).

Figure 6:
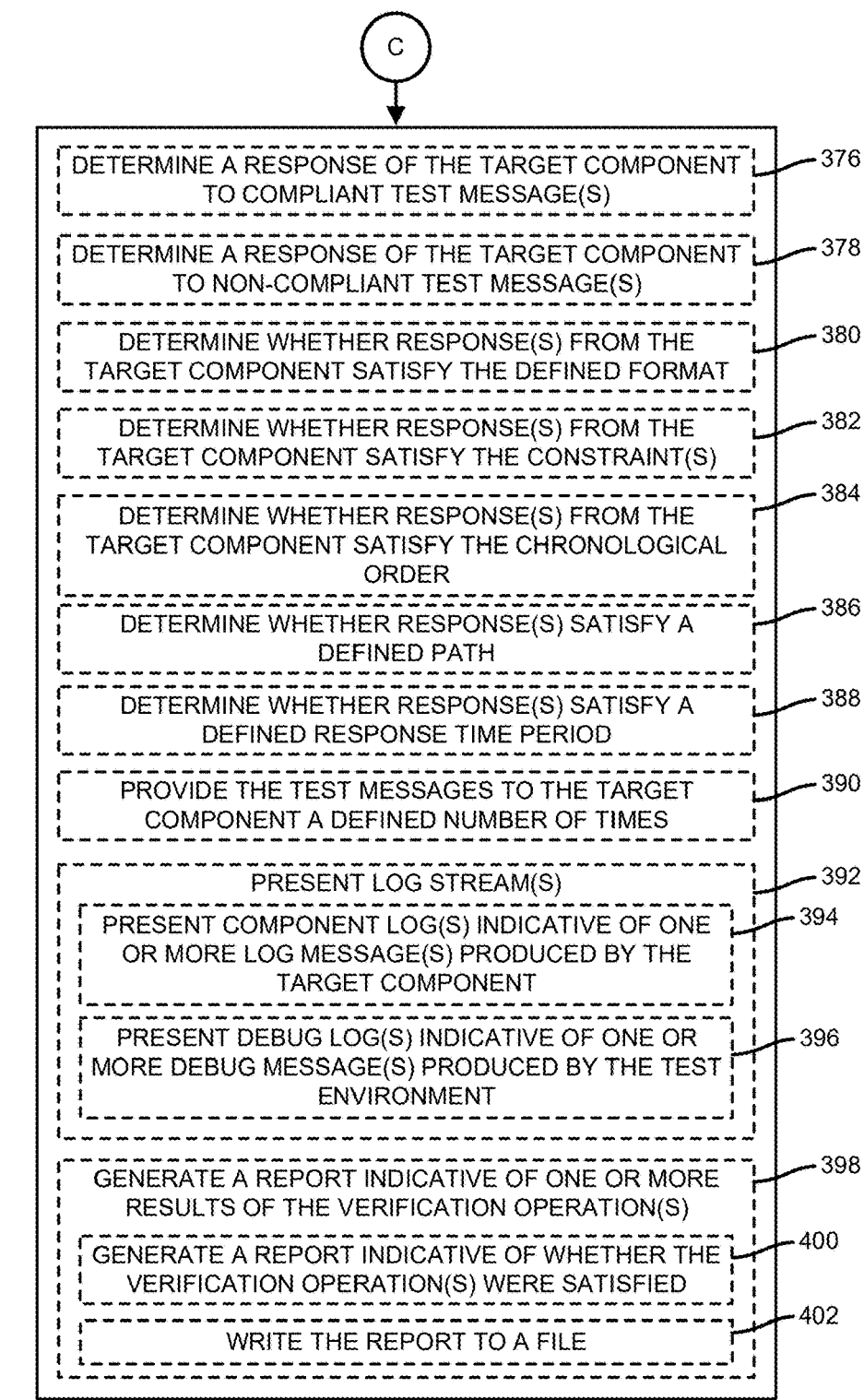

Referring now to FIG. 6, the verification compute device 110 may determine a response of the target component to one or more compliant test messages (e.g., one or more messages generated in compliance with the test sequence data from block 332), as indicated in block 376. Additionally or alternatively, the verification compute device 110 may determine a response of the target component to one or more non-compliant test message (e.g., one or more generated messages that are known to not be in compliance with the test sequence data from block 332, such as one or messages with a parameter value that does not satisfy a corresponding constraint defined in the test sequence data), as indicated in block 378. The verification compute device 110, in performing verification operations, may determine whether response (s) (e.g., one or messages sent from the target component) satisfy a defined format and/or one or more constraints (e.g., for parameter values), as indicated in blocks 380, 382. The verification compute device 110 may additionally determine whether responses from the target component satisfy a chronological order in which messages should occur, including any alternative paths, as indicated in blocks 384, 386. That is, where multiple alternative paths are present, the verification compute device 110 may determine whether messages to and from the target component have proceeded along any of the available paths (e.g., along the path 1110 or the path 1112 shown in FIG. 11).

In performing the verification operations, the verification compute device 110 may determine whether responses from the target component satisfy a defined (e.g., defined by a user of a user compute device 140, 142) response time period (e.g., a timeout period), as indicated in block 388. That is, if the target component does not send a responsive message within the response time period (e.g., in response to a message sent to the target component), the verification compute device 110 may determine that the target component failed to satisfy the defined response time period. In at least some embodiments, the verification compute device 110 may provide the test messages to the target component a defined number of times (e.g., a number of times defined by a user of a user compute device 140, 142), as indicated in block 390. That is, the verification compute device 110 may iterate through multiple rounds of generating messages as a function of the test sequence data (e.g., with differing content from one iteration to the next, generated based on the formats, constraints, chronological orders and paths defined in the test sequence data), sending the messages to the target component, and monitoring responses of the target component. By performing multiple iterations of messages, the verification compute device 110 may identify inconsistencies in the performance of the target component.

In at least some embodiments, the verification compute device 110 may present one or more log streams when performing the verification operations, as indicated in block 392. In doing so, the verification compute device 110 may present one or more component logs which may be embodied as any data indicative of one or more log messages produced by the target component (e.g., during the verification operations), as indicated in block 394. Additionally or alternatively, the verification compute device 110 may present one or more debug logs, which may be embodied as any data indicative of one or more debug messages produced by the test environment (e.g., any other components of the model, other that the target component), as indicated in block 396. The verification compute device 110 may generate a report (e.g., a summary) indicative of one or more results of the verification operations, as indicated in block 398. In doing so, the verification compute device 110 may generate a report indicative of whether the verification operations were satisfied (e.g., whether messages sent from the target component matched the format, constraints, chronological order, including any alternate paths, defined in the test sequence data, whether the target component responded within the defined response time period, etc.), as indicated in block 400. In some embodiments, the report may indicate the specific message that was sent to the target component that caused a response that did not satisfy the test sequence data. Further, the report may indicate the date and time at which the verification operations were performed. The verification compute device 110 may write the report to a file, such as portable document format (PDF) file, a text file with JavaScript Object Notation (JSON) data, or the like (e.g., for dissemination and later review by one or more users), as indicated in block 402.

Figure 13:
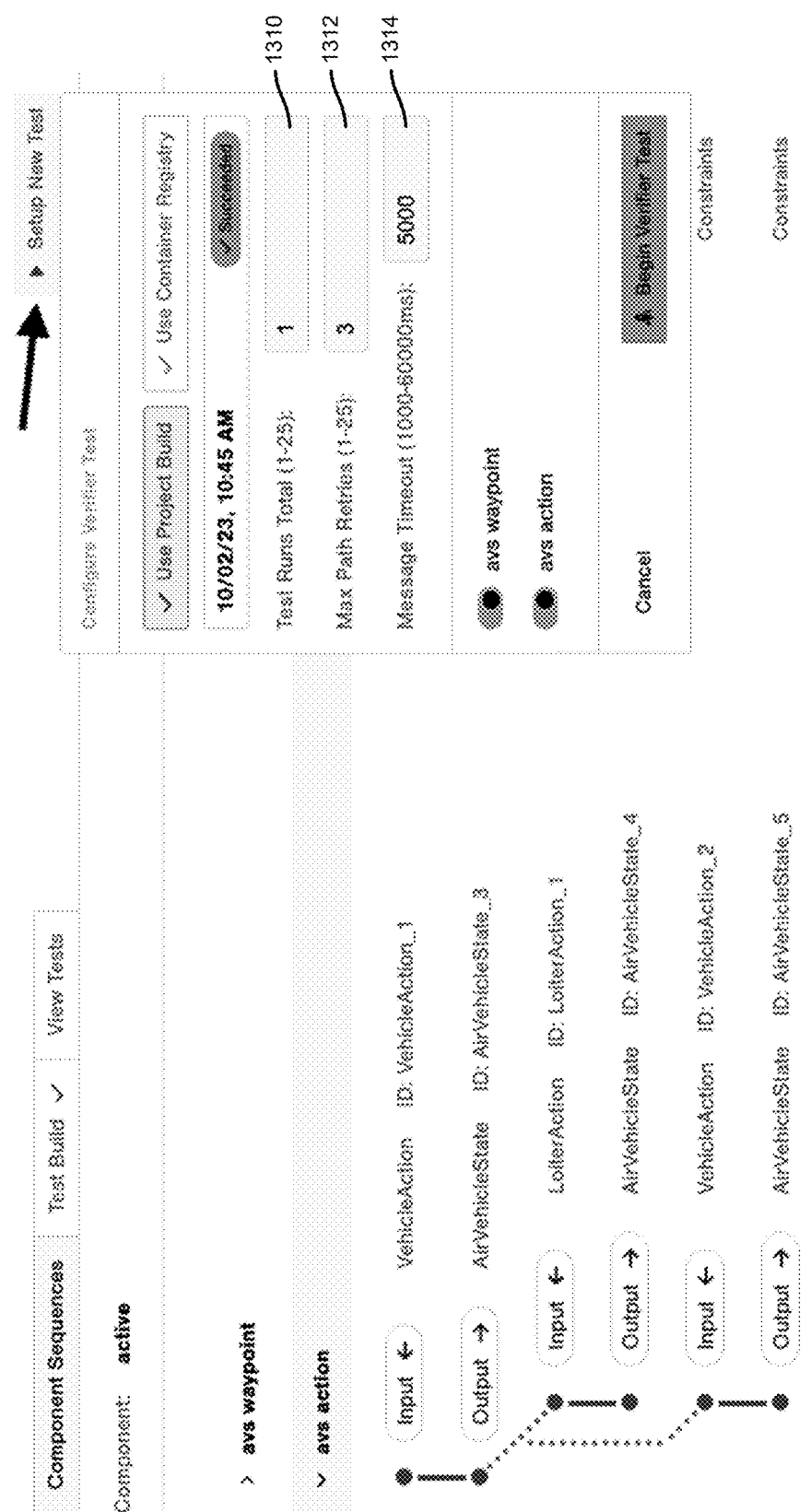

Referring briefly to FIG. 13, a user interface 1300 that may be presented by the verification compute device 110 (e.g., remotely accessed by a user compute device 140, 142) to initiate verification operations includes a field 1310 in which a number of test runs may be defined (e.g., corresponding to block 390 of FIG. 6) and a field 1312 in which a number of maximum retries may be defined (e.g., a number of retries to attempt if test sequence data (e.g., a chronological order in the test sequence data) is unsatisfied). For example, a value of three may cause the validation compute device 110 to perform attempts (e.g., test the ability of the target component to send message in accordance with a defined chronological order or path within the chronological order) up to three times. That is, if the target component satisfies the chronological order or path within the chronological order on the second attempt, the verification compute device 110 will not perform another attempt. Further, the user interface 1300 includes a field 1314 in which a message timeout (e.g., the time period referenced in block 388 of FIG. 6) may be defined.

Figure 14:
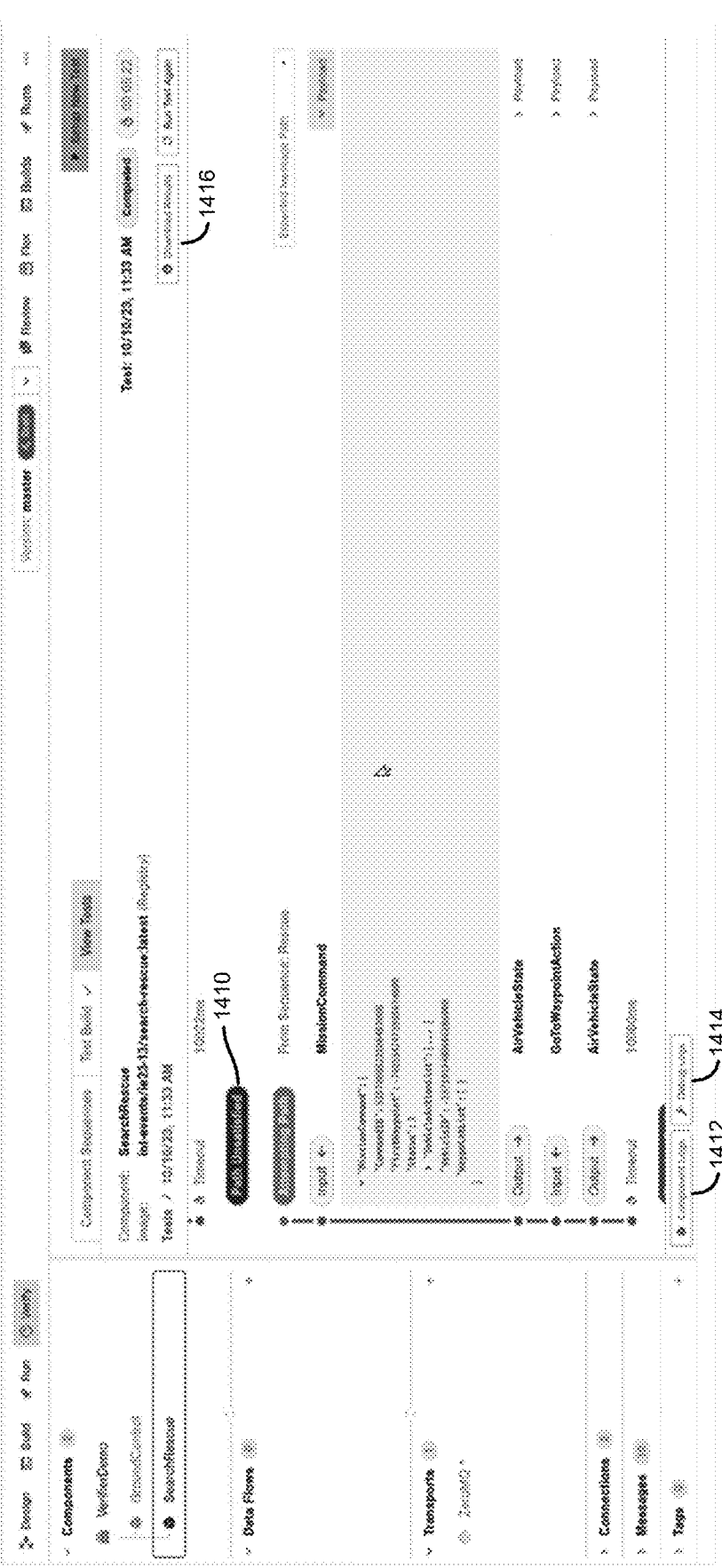

Referring briefly to FIG. 14, a user interface 1400 that may be produced by the verification compute device 110 (e.g., remotely accessed by a user compute device 140, 142) to present one or more results of the verification operations includes an element 1410 indicating that a path was unsatisfied. Additionally, the user interface 1400 includes tabs 1412, 1414 for presenting one or more component logs (e.g., corresponding to block 394 of FIG. 6) or presenting one or more debug logs (e.g., corresponding to block 396 of FIG. 6). Additionally, the user interface 1400 includes an element 1416 that may be selected to cause the verification compute device 110 to provide a report of the verification results (e.g., stored as a file, in accordance with block 402 of FIG. 6) to a user (e.g., of a user compute device 140, 142).

While certain illustrative embodiments have been described in detail in the drawings and the foregoing description, such an illustration and description is to be considered as exemplary and not restrictive in character, it being understood that only illustrative embodiments have been shown and described and that all changes and modifications that come within the spirit of the disclosure are desired to be protected. Additional embodiments may be described in the attached appendix. There exist a plurality of advantages of the present disclosure arising from the various features of the apparatus, systems, and methods described herein. It will be noted that alternative embodiments of the apparatus, systems, and methods of the present disclosure may not include all of the features described, yet still benefit from at least some of the advantages of such features. Those of ordinary skill in the art may readily devise their own implementations of the apparatus, systems, and methods that incorporate one or more of the features of the present disclosure.

EXAMPLES

Illustrative examples of the technologies disclosed herein are provided below. An embodiment of the technologies may include any one or more, and any combination of, the examples described below.

Example 1 includes a device for verifying operations of a component in a software system prior to implementation in a production environment comprising: at least one processor; a memory coupled with the at least one processor, the memory including instructions that, when executed by the at least one processor cause the at least one processor to: obtain design data indicative of a model of interconnected components of a software system under development, wherein each component is connected to at least one other component of the software system and communicates using a corresponding interface defined in the design data; obtain test sequence data indicative of rules pertaining to a sequence of messages to be communicated between a target component of the software system and one or more other components of the model defined in the design data; and perform, in a test environment that emulates the model in which the target component is defined, a set of verification operations to determine a response of the target component to one or more messages generated as a function of the test sequence data, wherein content of the messages are randomly generated based on the rules indicated by the test sequence data, thereby enabling verification that the target component operates in accordance with the design data without requiring the content of each of the messages to be expressly scripted prior to verification and without requiring each component of the software system to be implemented in a production environment prior to verification of the operation of the target component.

Example 2 includes the subject matter of Example 1, and wherein to obtain design data comprises to obtain design data defined via a graphical user interface in which each component is represented at a corresponding position in a two dimensional space.

Example 3 includes the subject matter of any of Examples 1 and 2, and wherein to obtain design data comprises to obtain design data indicative of an interface for each component.

Example 4 includes the subject matter of any of Examples 1-3, and wherein to obtain design data indicative of an interface for each component comprises to obtain design data indicative of messages utilized by each component to communicate with other components of the software system.

Example 5 includes the subject matter of any of Examples 1-4, and wherein to obtain design data further comprises to obtain design data indicative of a direction of each message associated with the interface.

Example 6 includes the subject matter of any of Examples 1-5, and wherein to obtain design data comprises to obtain design data indicative of one or more connections between the components.

Example 7 includes the subject matter of any of Examples 1-6, and wherein to obtain design data indicative of one or more connections between the components comprises to obtain design data indicative of one or more messages to be sent through a corresponding connection.

Example 8 includes the subject matter of any of Examples 1-7, and wherein to obtain design data indicative of one or more connections between the components comprises to obtain design data indicative of a directionality of each connection.

Example 9 includes the subject matter of any of Examples 1-8, and wherein to obtain design data indicative of one or more connections between the components comprises to obtain design data indicative of a transport that delivers messages associated with each connection.

Example 10 includes the subject matter of any of Examples 1-9, and wherein to obtain design data indicative of one or more connections between the components comprises to obtain design data indicative of a transformation of messages between differing interfaces of multiple components in the model.

Example 11 includes the subject matter of any of Examples 1-10, and wherein to obtain design data comprises to obtain design data indicative of a grouping of two or more of the components.

Example 12 includes the subject matter of any of Examples 1-11, and wherein the at least one processor is further configured to perform one or more build operations to convert the design data to code.

Example 13 includes the subject matter of any of Examples 1-12, and wherein to convert the design data to code comprises to convert the design data to source code.

Example 14 includes the subject matter of any of Examples 1-13, and wherein to convert the design data to code comprises to convert the design data to executable code.

Example 15 includes the subject matter of any of Examples 1-14, and wherein the at least one processor is further configured to generate one or more container images for one or more of the components defined in the design data.

Example 16 includes the subject matter of any of Examples 1-15, and wherein the at least one processor is further configured to generate a container image for a transform defined in the design data.

Example 17 includes the subject matter of any of Examples 1-16, and wherein to obtain test sequence data comprises to obtain test sequence data indicative of a direction for each message.

Example 18 includes the subject matter of any of Examples 1-17, and wherein to obtain test sequence data indicative of a direction for each messages comprises to obtain test sequence data indicative of whether each message is to be sent to or received from the target component.

Example 19 includes the subject matter of any of Examples 1-18, and wherein to obtain test sequence data comprises to obtain test sequence data indicative of a format of each message.

Example 20 includes the subject matter of any of Examples 1-19, and wherein to obtain test sequence data indicative of a format of each message comprises to obtain test sequence data indicative of one or more parameters and a corresponding data type for each parameter.

Example 21 includes the subject matter of any of Examples 1-20, and wherein to obtain test sequence data comprises to obtain test sequence data indicative of a chronological order for the messages in the sequence.

Example 22 includes the subject matter of any of Examples 1-21, and wherein to obtain test sequence data further comprises to obtain data indicative of alternate paths for the messages in the sequence.

Example 23 includes the subject matter of any of Examples 1-22, and wherein to obtain test sequence data comprises to obtain test sequence data indicative of one or more constraints that define valid parameter values.

Example 24 includes the subject matter of any of Examples 1-23, and wherein to obtain test sequence data indicative of one or more constraints comprise to obtain test sequence data indicative of at least one constraint defined as a static value, a range, or a function of one or more previous messages.

Example 25 includes the subject matter of any of Examples 1-24, and wherein to perform one or more verification operations comprises to execute the target component in a container.

Example 26 includes the subject matter of any of Examples 1-25, and wherein to perform one or more verification operations comprises to generate one or more messages determined to be compliant with the test sequence data.

Example 27 includes the subject matter of any of Examples 1-26, and wherein to generate one or more messages determined to be compliant with the test sequence data comprises to generate messages that comply with one or more of a format, a constraint, or a chronological order defined in the test sequence data.

Example 28 includes the subject matter of any of Examples 1-27, and wherein to perform one or more verification operations comprises to generate one or more messages determined to not be compliant with the test sequence data.

Example 29 includes the subject matter of any of Examples 1-28, and wherein to generate one or more messages determined to not be compliant with the test sequence data comprises to generate at least one message determined not to comply with a format, a constraint, or a chronological order defined in the test sequence data.

Example 30 includes the subject matter of any of Examples 1-29, and wherein to perform one or more verification operations comprises to provide the one or more messages generated as a function of the test sequence data to the target component; and monitor one or more responses of the target component to the one or more messages.

Example 31 includes the subject matter of any of Examples 1-30, and wherein to determine a response comprises to determine a response of the target component to one or more messages determined to be compliant with the test sequence data.

Example 32 includes the subject matter of any of Examples 1-31, and wherein to determine a response comprises to determine a response of the target component to one or more messages determined to be non-compliant with the test sequence data.

Example 33 includes the subject matter of any of Examples 1-32, and wherein to determine a response comprises to determine whether one or more messages sent by the target component satisfy a format defined in the test sequence data.

Example 34 includes the subject matter of any of Examples 1-33, and wherein to determine a response comprises to determine whether a response from the target component satisfies a constraint on a parameter value defined in the test sequence data.

Example 35 includes the subject matter of any of Examples 1-34, and wherein to determine a response comprises to determine whether a set of responses from the target component satisfy a chronological order for messages defined in the test sequence data.

Example 36 includes the subject matter of any of Examples 1-35, and wherein to determine a response comprises to determine whether a set of responses from the target component satisfy a path defined in the test sequence data.

Example 37 includes the subject matter of any of Examples 1-36, and wherein to determine a response comprises to determine whether a response from the target component satisfies a defined response time period.

Example 38 includes the subject matter of any of Examples 1-37, and wherein to determine a response comprises to provide, to the target component, messages generated as a function of the test sequence data a defined number of times.

Example 39 includes the subject matter of any of Examples 1-38, and wherein the at least one processor is further configured to present one or more log streams.

Example 40 includes the subject matter of any of Examples 1-39, and wherein to present one or more log streams comprises to present one or more component logs indicative of log messages produced by the target component as the verification operations are performed.

Example 41 includes the subject matter of any of Examples 1-40, and wherein to present one or more log streams comprises to present one or more debug logs indicative of debug messages produced by the test environment as the verification operations are performed.

Example 42 includes the subject matter of any of Examples 1-41, and wherein the at least one processor is further configured to generate a report indicative of a result of the verification operations.

Example 43 includes the subject matter of any of Examples 1-42, and wherein to generate a report comprises to generate a report indicative of whether the verification operations were satisfied.

Example 44 includes the subject matter of any of Examples 1-43, and wherein to generate a report comprises to write the report to a file.

Example 45 includes a method for verifying operations of a component in a software system prior to implementation in a production environment comprising: obtaining, by a compute device, design data indicative of a model of interconnected components of a software system under development, wherein each component is connected to at least one other component of the software system and communicates using a corresponding interface defined in the design data; obtaining, by the compute device, test sequence data indicative of rules pertaining to a sequence of messages to be communicated between a target component of the software system and one or more other components of the model defined in the design data; and performing, by the compute device and in a test environment that emulates the model in which the target component is defined, a set of verification operations to determine a response of the target component to one or more messages generated as a function of the test sequence data, wherein content of the messages are randomly generated based on the rules indicated by the test sequence data, thereby enabling verification that the target component operates in accordance with the design data without requiring the content of each of the messages to be expressly scripted prior to verification and without requiring each component of the software system to be implemented in a production environment prior to verification of the operation of the target component.

Example 46 includes the subject matter of Example 45, and wherein obtaining design data comprises obtaining design data defined via a graphical user interface in which each component is represented at a corresponding position in a two dimensional space.

Example 47 includes the subject matter of any of Examples 45 and 46, and wherein obtaining design data comprises obtaining design data indicative of an interface for each component.

Example 48 includes the subject matter of any of Examples 45-47, and wherein obtaining design data indicative of an interface for each component comprises obtaining design data indicative of messages utilized by each component to communicate with other components of the software system.

Example 49 includes the subject matter of any of Examples 45-48, and wherein obtaining design data further comprises obtaining design data indicative of a direction of each message associated with the interface.

Example 50 includes the subject matter of any of Examples 45-49, and wherein obtaining design data comprises obtaining design data indicative of one or more connections between the components.

Example 51 includes the subject matter of any of Examples 45-50, and wherein obtaining design data indicative of one or more connections between the components comprises obtaining design data indicative of one or more messages to be sent through a corresponding connection.

Example 52 includes the subject matter of any of Examples 45-51, and wherein obtaining design data indicative of one or more connections between the components comprises obtaining design data indicative of a directionality of each connection.

Example 53 includes the subject matter of any of Examples 45-52, and wherein obtaining design data indicative of one or more connections between the components comprises obtaining design data indicative of a transport that delivers messages associated with each connection.

Example 54 includes the subject matter of any of Examples 45-53, and wherein obtaining design data indicative of one or more connections between the components comprises obtaining design data indicative of a transformation of messages between differing interfaces of multiple components in the model.

Example 55 includes the subject matter of any of Examples 45-54, and wherein obtaining design data comprises obtaining design data indicative of a grouping of two or more of the components.

Example 56 includes the subject matter of any of Examples 45-55, and further including performing, by the compute device, one or more build operations to convert the design data to code.

Example 57 includes the subject matter of any of Examples 45-56, and wherein converting the design data to code comprises converting the design data to source code.

Example 58 includes the subject matter of any of Examples 45-57, and wherein converting the design data to code comprises converting the design data to executable code.

Example 59 includes the subject matter of any of Examples 45-58, and further including generating, by the compute device, one or more container images for one or more of the components defined in the design data.

Example 60 includes the subject matter of any of Examples 45-59, and further including generating, by the compute device, a container image for a transform defined in the design data.

Example 61 includes the subject matter of any of Examples 45-60, and wherein obtaining test sequence data comprises obtaining test sequence data indicative of a direction for each message.

Example 62 includes the subject matter of any of Examples 45-61, and wherein obtaining test sequence data indicative of a direction for each messages comprises obtaining test sequence data indicative of whether each message is to be sent to or received from the target component.

Example 63 includes the subject matter of any of Examples 45-62, and wherein obtaining test sequence data comprises obtaining test sequence data indicative of a format of each message.

Example 64 includes the subject matter of any of Examples 45-63, and wherein obtaining test sequence data indicative of a format of each message comprises obtaining test sequence data indicative of one or more parameters and a corresponding data type for each parameter.

Example 65 includes the subject matter of any of Examples 45-64, and wherein obtaining test sequence data comprises obtaining test sequence data indicative of a chronological order for the messages in the sequence.

Example 66 includes the subject matter of any of Examples 45-65, and wherein obtaining test sequence data further comprises obtaining data indicative of alternate paths for the messages in the sequence.

Example 67 includes the subject matter of any of Examples 45-66, and wherein obtaining test sequence data comprises obtaining test sequence data indicative of one or more constraints that define valid parameter values.

Example 68 includes the subject matter of any of Examples 45-67, and wherein obtaining test sequence data indicative of one or more constraints comprises obtaining test sequence data indicative of at least one constraint defined as a static value, a range, or a function of one or more previous messages.

Example 69 includes the subject matter of any of Examples 45-68, and wherein performing one or more verification operations comprises executing the target component in a container.

Example 70 includes the subject matter of any of Examples 45-69, and wherein performing one or more verification operations comprises generating one or more messages determined to be compliant with the test sequence data.

Example 71 includes the subject matter of any of Examples 45-70, and wherein generating one or more messages determined to be compliant with the test sequence data comprises generating messages that comply with one or more of a format, a constraint, or a chronological order defined in the test sequence data.

Example 72 includes the subject matter of any of Examples 45-71, and wherein performing one or more verification operations comprises generating one or more messages determined to not be compliant with the test sequence data.

Example 73 includes the subject matter of any of Examples 45-72, and wherein generating one or more messages determined to not be compliant with the test sequence data comprises generating at least one message determined not to comply with a format, a constraint, or a chronological order defined in the test sequence data.

Example 74 includes the subject matter of any of Examples 45-73, and wherein performing one or more verification operations comprises providing the one or more messages generated as a function of the test sequence data to the target component; and monitoring one or more responses of the target component to the one or more messages.

Example 75 includes the subject matter of any of Examples 45-74, and wherein determining a response comprises determining a response of the target component to one or more messages determined to be compliant with the test sequence data.

Example 76 includes the subject matter of any of Examples 45-75, and wherein determining a response comprises determining a response of the target component to one or more messages determined to be non-compliant with the test sequence data.

Example 77 includes the subject matter of any of Examples 45-76, and wherein determining a response comprises determining whether one or more messages sent by the target component satisfy a format defined in the test sequence data.

Example 78 includes the subject matter of any of Examples 45-77, and wherein determining a response comprises determining whether a response from the target component satisfies a constraint on a parameter value defined in the test sequence data.

Example 79 includes the subject matter of any of Examples 45-78, and wherein determining a response comprises determining whether a set of responses from the target component satisfy a chronological order for messages defined in the test sequence data.

Example 80 includes the subject matter of any of Examples 45-79, and wherein determining a response comprises determining whether a set of responses from the target component satisfy a path defined in the test sequence data.

Example 81 includes the subject matter of any of Examples 45-80, and wherein determining a response comprises determining whether a response from the target component satisfies a defined response time period.

Example 82 includes the subject matter of any of Examples 45-81, and wherein determining a response comprises providing, to the target component, messages generated as a function of the test sequence data a defined number of times.

Example 83 includes the subject matter of any of Examples 45-82, and further including presenting, by the compute device, one or more log streams.

Example 84 includes the subject matter of any of Examples 45-83, and wherein presenting one or more log streams comprises presenting one or more component logs indicative of log messages produced by the target component as the verification operations are performed.

Example 85 includes the subject matter of any of Examples 45-84, and wherein presenting one or more log streams comprises presenting one or more debug logs indicative of debug messages produced by the test environment as the verification operations are performed.

Example 86 includes the subject matter of any of Examples 45-85, and further including generating, by the compute device, a report indicative of a result of the verification operations.

Example 87 includes the subject matter of any of Examples 45-86, and wherein generating a report comprises generating a report indicative of whether the verification operations were satisfied.

Example 88 includes the subject matter of any of Examples 45-87, and wherein generating a report comprises writing the report to a file.

Example 89 includes one or more machine-readable storage media comprising a plurality of instructions stored thereon that, in response to being executed, cause a device to obtain design data indicative of a model of interconnected components of a software system under development, wherein each component is connected to at least one other component of the software system and communicates using a corresponding interface defined in the design data; obtain test sequence data indicative of rules pertaining to a sequence of messages to be communicated between a target component of the software system and one or more other components of the model defined in the design data; and perform, in a test environment that emulates the model in which the target component is defined, a set of verification operations to determine a response of the target component to one or more messages generated as a function of the test sequence data, wherein content of the messages are randomly generated based on the rules indicated by the test sequence data, thereby enabling verification that the target component operates in accordance with the design data without requiring the content of each of the messages to be expressly scripted prior to verification and without requiring each component of the software system to be implemented in a production environment prior to verification of the operation of the target component.

Example 90 includes the subject matter of Example 89, and wherein to obtain design data comprises to obtain design data defined via a graphical user interface in which each component is represented at a corresponding position in a two dimensional space.

Example 91 includes the subject matter of any of Examples 89 and 90, and wherein to obtain design data comprises to obtain design data indicative of an interface for each component.

Example 92 includes the subject matter of any of Examples 89-91, and wherein to obtain design data indicative of an interface for each component comprises to obtain design data indicative of messages utilized by each component to communicate with other components of the software system.

Example 93 includes the subject matter of any of Examples 89-92, and wherein to obtain design data further comprises to obtain design data indicative of a direction of each message associated with the interface.

Example 94 includes the subject matter of any of Examples 89-93, and wherein to obtain design data comprises to obtain design data indicative of one or more connections between the components.

Example 95 includes the subject matter of any of Examples 89-94, and wherein to obtain design data indicative of one or more connections between the components comprises to obtain design data indicative of one or more messages to be sent through a corresponding connection.

Example 96 includes the subject matter of any of Examples 89-95, and wherein to obtain design data indicative of one or more connections between the components comprises to obtain design data indicative of a directionality of each connection.

Example 97 includes the subject matter of any of Examples 89-96, and wherein to obtain design data indicative of one or more connections between the components comprises to obtain design data indicative of a transport that delivers messages associated with each connection.

Example 98 includes the subject matter of any of Examples 89-97, and wherein to obtain design data indicative of one or more connections between the components comprises to obtain design data indicative of a transformation of messages between differing interfaces of multiple components in the model.

Example 99 includes the subject matter of any of Examples 89-98, and wherein to obtain design data comprises to obtain design data indicative of a grouping of two or more of the components.

Example 100 includes the subject matter of any of Examples 89-99, and wherein the instructions additionally cause the device to perform one or more build operations to convert the design data to code.

Example 101 includes the subject matter of any of Examples 89-100, and wherein to convert the design data to code comprises to convert the design data to source code.

Example 102 includes the subject matter of any of Examples 89-101, and wherein to convert the design data to code comprises to convert the design data to executable code.

Example 103 includes the subject matter of any of Examples 89-102, and wherein the instructions additionally cause the device to generate one or more container images for one or more of the components defined in the design data.

Example 104 includes the subject matter of any of Examples 89-103, and wherein the instructions additionally cause the device to generate a container image for a transform defined in the design data.

Example 105 includes the subject matter of any of Examples 89-104, and wherein to obtain test sequence data comprises to obtain test sequence data indicative of a direction for each message.

Example 106 includes the subject matter of any of Examples 89-105, and wherein to obtain test sequence data indicative of a direction for each messages comprises to obtain test sequence data indicative of whether each message is to be sent to or received from the target component.

Example 107 includes the subject matter of any of Examples 89-106, and wherein to obtain test sequence data comprises to obtain test sequence data indicative of a format of each message.

Example 108 includes the subject matter of any of Examples 89-107, and wherein to obtain test sequence data indicative of a format of each message comprises to obtain test sequence data indicative of one or more parameters and a corresponding data type for each parameter.

Example 109 includes the subject matter of any of Examples 89-108, and wherein to obtain test sequence data comprises to obtain test sequence data indicative of a chronological order for the messages in the sequence.

Example 110 includes the subject matter of any of Examples 89-109, and wherein to obtain test sequence data further comprises to obtain data indicative of alternate paths for the messages in the sequence.

Example 111 includes the subject matter of any of Examples 89-110, and wherein to obtain test sequence data comprises to obtain test sequence data indicative of one or more constraints that define valid parameter values.

Example 112 includes the subject matter of any of Examples 89-111, and wherein to obtain test sequence data indicative of one or more constraints comprise to obtain test sequence data indicative of at least one constraint defined as a static value, a range, or a function of one or more previous messages.

Example 113 includes the subject matter of any of Examples 89-112, and wherein to perform one or more verification operations comprises to execute the target component in a container.

Example 114 includes the subject matter of any of Examples 89-113, and wherein to perform one or more verification operations comprises to generate one or more messages determined to be compliant with the test sequence data.

Example 115 includes the subject matter of any of Examples 89-114, and wherein to generate one or more messages determined to be compliant with the test sequence data comprises to generate messages that comply with one or more of a format, a constraint, or a chronological order defined in the test sequence data.

Example 116 includes the subject matter of any of Examples 89-115, and wherein to perform one or more verification operations comprises to generate one or more messages determined to not be compliant with the test sequence data.

Example 117 includes the subject matter of any of Examples 89-116, and wherein to generate one or more messages determined to not be compliant with the test sequence data comprises to generate at least one message determined not to comply with a format, a constraint, or a chronological order defined in the test sequence data.

Example 118 includes the subject matter of any of Examples 89-117, and wherein to perform one or more verification operations comprises to provide the one or more messages generated as a function of the test sequence data to the target component; and monitor one or more responses of the target component to the one or more messages.

Example 119 includes the subject matter of any of Examples 89-118, and wherein to determine a response comprises to determine a response of the target component to one or more messages determined to be compliant with the test sequence data.

Example 120 includes the subject matter of any of Examples 89-119, and wherein to determine a response comprises to determine a response of the target component to one or more messages determined to be non-compliant with the test sequence data.

Example 121 includes the subject matter of any of Examples 89-120, and wherein to determine a response comprises to determine whether one or more messages sent by the target component satisfy a format defined in the test sequence data.

Example 122 includes the subject matter of any of Examples 89-121, and wherein to determine a response comprises to determine whether a response from the target component satisfies a constraint on a parameter value defined in the test sequence data.

Example 123 includes the subject matter of any of Examples 89-122, and wherein to determine a response comprises to determine whether a set of responses from the target component satisfy a chronological order for messages defined in the test sequence data.

Example 124 includes the subject matter of any of Examples 89-123, and wherein to determine a response comprises to determine whether a set of responses from the target component satisfy a path defined in the test sequence data.

Example 125 includes the subject matter of any of Examples 89-124, and wherein to determine a response comprises to determine whether a response from the target component satisfies a defined response time period.

Example 126 includes the subject matter of any of Examples 89-125, and wherein to determine a response comprises to provide, to the target component, messages generated as a function of the test sequence data a defined number of times.

Example 127 includes the subject matter of any of Examples 89-126, and wherein the instructions additionally cause the device to present one or more log streams.

Example 128 includes the subject matter of any of Examples 89-127, and wherein to present one or more log streams comprises to present one or more component logs indicative of log messages produced by the target component as the verification operations are performed.

Example 129 includes the subject matter of any of Examples 89-128, and wherein to present one or more log streams comprises to present one or more debug logs indicative of debug messages produced by the test environment as the verification operations are performed.

Example 130 includes the subject matter of any of Examples 89-129, and wherein the instructions additionally cause the device to generate a report indicative of a result of the verification operations.

Example 131 includes the subject matter of any of Examples 89-130, and wherein to generate a report comprises to generate a report indicative of whether the verification operations were satisfied.

Example 132 includes the subject matter of any of Examples 89-131, and wherein to generate a report comprises to write the report to a file.

The invention claimed is:

1. A device for verifying operations of a component in a software system prior to implementation in a production environment comprising:

at least one processor;

a memory coupled with the at least one processor, the memory including instructions that, when executed by the at least one processor cause the at least one processor to:

obtain test sequence data indicative of rules pertaining to a sequence of messages to be communicated between a target component of a model of software system under development and one or more other components of the model, including data indicative of alternate paths for the messages in the sequence to be selected as a function of whether a defined condition pertaining to a response from the one or more other components of the model is satisfied; and perform, in a test environment that emulates the model in which the target component is defined, a set of verification operations to determine whether a set of one or more responses of the target component to one or more messages generated as a function of the test sequence data satisfy one of the paths in the test sequence data, wherein each path represents an alternative chronological order of messages, wherein content of the messages are randomly generated based on the rules indicated by the test sequence data, thereby enabling verification of operation of the target component without requiring the content of each of the messages to be expressly scripted prior to verification and without requiring each component of the software system to be implemented in a production environment prior to verification of the operation of the target component.

2. The device of claim 1, wherein the at least one processor is further configured to:

obtain test sequence data indicative of a direction for each message, a format of each message, and a chronological order for the messages in the sequence, wherein the format is indicative of one or more parameters and a corresponding data type for each parameter.

3. The device of claim 1, wherein the at least one processor is further configured to:

execute the target component in a container, wherein the container includes executable code for the target component and dependencies utilized by the executable code for the target component;

generate messages that comply with a format, a constraint, and a chronological order defined in the test sequence data; and send, to the target component executed in the container, the messages generated in compliance with the format, constraint, and chronological order.

4. The device of claim 1, wherein the at least one processor is further configured to:

generate one or more messages determined to not be compliant with the test sequence data to determine a response of the target component to anomalous messages, wherein the one or more messages do not comply with one or more of a format, a constraint, or a chronological order defined in the test sequence data; and send the one or more messages determined to not be compliant with the test sequence data to the target component to prompt the response from the target component.

5. The device of claim 1, wherein the at least one processor is further configured to:

determine whether one or more messages sent by the target component satisfy a format defined in the test sequence data, a constraint on a parameter value defined in the test sequence data, a chronological order defined in the test sequence data, and a defined response time period.

6. The device of claim 1, wherein the at least one processor is further configured to:

provide, to the target component, messages generated as a function of the test sequence data over a defined number of iterations, wherein the content of the messages differ between each iteration, thereby enabling monitoring of a consistency in the operations of the target component to variations in the messages.

7. The device of claim 1, wherein the at least one processor is further configured to:

generate a report that is indicative of a specific message that was sent to the target component that caused a response that did not satisfy the test sequence data and a date and time at which the verification operations were performed.

8. The device of claim 1, wherein the at least one processor is further configured to:

obtain data indicative of a transport that delivers messages associated with each of multiple connections between components of the model;

obtain data indicative of a transformation of messages between differing interfaces of multiple components in the model; and emulate delivery of the messages associated with the transport and perform the transformation of the messages during the verification operations.

9. The device of claim 1, wherein the at least one processor is further configured to:

obtain design data indicative of the model based on interactions with a graphical user interface in which each component is represented at a corresponding position in a two dimensional space; and perform the set of verifications in response to a selection of a corresponding option in the graphical user interface.

10. The device of claim 9, wherein the at least one processor is further configured to:

obtain the design data based on interactions with the graphical user interface that are controlled by a machine learning model that is trained to determine each interface and connections between the components based on input data indicative of one or more of messages previously transmitted between the components, descriptions of the components, or diagrams of the components.

11. The device of claim 9, wherein the at least one processor is further configured to:

obtain, through the graphical user interface, data indicative of a maximum number of retries for the target component to satisfy one of the paths in the test sequence data; and determine, in the set of verification operations, whether the target component satisfied one of the paths in the test sequence data within the maximum number of retries.

12. A method for verifying operations of a component in a software system prior to implementation in a production environment comprising:

obtaining, by the compute device, test sequence data indicative of rules pertaining to a sequence of messages to be communicated between a target component of a model of a software system under development and one or more other components of the model, including data indicative of alternate paths for the messages in the sequence to be selected as a function of whether a defined condition pertaining to a response from the one or more other components of the model is satisfied; and performing, by the compute device and in a test environment that emulates the model in which the target component is defined, a set of verification operations to determine whether a set of one or more responses of the target component to one or more messages generated as a function of the test sequence data satisfy one of the paths in the test sequence data, wherein each path represents an alternative chronological order of messages, wherein content of the messages are randomly generated based on the rules indicated by the test sequence data, thereby enabling verification of operation of the target component without requiring the content of each of the messages to be expressly scripted prior to verification and without requiring each component of the software system to be implemented in a production environment prior to verification of the operation of the target component.

13. The method of claim 12, further comprising:

obtaining, by the compute device, test sequence data indicative of a direction for each message, a format of each message, and a chronological order for the messages in the sequence, wherein the format is indicative of one or more parameters and a corresponding data type for each parameter.

14. The method of claim 12, further comprising:

executing, by the compute device, the target component in a container, wherein the container includes executable code for the target component and dependencies utilized by the executable code for the target component;

generating, by the compute device, messages that comply with a format, a constraint, and a chronological order defined in the test sequence data; and sending, by the compute device and to the target component executed in the container, the messages generated in compliance with the format, constraint, and chronological order.

15. The method of claim 11, further comprising:

generating, by the compute device, one or more messages determined to not be compliant with the test sequence data to determine a response of the target component to anomalous messages, wherein the one or more messages do not comply with one or more of a format, a constraint, or a chronological order defined in the test sequence data; and sending, by the compute device, the one or more messages determined to not be compliant with the test sequence data to the target component to prompt the response from the target component.

16. The method of claim 11, further comprising:

determining, by the compute device, whether one or more messages sent by the target component satisfy a format defined in the test sequence data, a constraint on a parameter value defined in the test sequence data, a chronological order defined in the test sequence data, and a defined response time period.

17. The method of claim 12, further comprising:

providing, by the compute device and to the target component, messages generated as a function of the test sequence data over a defined number of iterations, wherein the content of the messages differ between each iteration, thereby enabling monitoring of a consistency in the operations of the target component to variations in the messages.

18. The method of claim 12, further comprising:

generating, by the compute device, a report that is indicative of a specific message that was sent to the target component that caused a response that did not satisfy the test sequence data and a date and time at which the verification operations were performed.

19. The method of claim 12, further comprising:

obtaining, by the compute device, data indicative of a transport that delivers messages associated with each of multiple connections between components of the model;

obtaining, by the compute device, data indicative of a transformation of messages between differing interfaces of multiple components in the model; and emulating, by the compute device, delivery of the messages associated with the transport and performing the transformation of the messages during the verification operations.

20. The method of claim 12, further comprising:

obtaining, by the compute device, design data indicative of the model based on interactions with a graphical user interface in which each component is represented at a corresponding position in a two dimensional space; and performing, by the compute device, the set of verifications in response to a selection of a corresponding option in the graphical user interface.

* * * * *